US010676127B2

(12) United States Patent
Takase et al.

(10) Patent No.: US 10,676,127 B2
(45) Date of Patent: Jun. 9, 2020

(54) ELECTRIC POWER STEERING APPARATUS

(71) Applicant: NSK LTD., Tokyo (JP)

(72) Inventors: Hiroaki Takase, Tokyo (JP); Ryo Minaki, Tokyo (JP); Hideki Sawada, Tokyo (JP); Takayoshi Sugawara, Tokyo (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 16/312,443

(22) PCT Filed: Jul. 20, 2017

(86) PCT No.: PCT/JP2017/026202
§ 371 (c)(1),
(2) Date: Dec. 21, 2018

(87) PCT Pub. No.: WO2018/016559
PCT Pub. Date: Jan. 25, 2018

(65) Prior Publication Data
US 2019/0241208 A1 Aug. 8, 2019

(30) Foreign Application Priority Data

Jul. 20, 2016 (JP) ................................. 2016-142625
Jun. 27, 2017 (JP) ................................. 2017-125084
Jul. 5, 2017 (JP) ................................. 2017-131849

(51) Int. Cl.
*B62D 5/04* (2006.01)
*H02P 6/10* (2006.01)
(Continued)

(52) U.S. Cl.
CPC ............... *B62D 5/046* (2013.01); *B62D 6/00* (2013.01); *B62D 6/10* (2013.01); *H02P 6/10* (2013.01);
(Continued)

(58) Field of Classification Search
CPC .. B62D 5/046; B62D 6/10; B62D 6/00; H02P 6/10; H02P 21/05; H02P 21/13; H02M 2001/385
See application file for complete search history.

(56) References Cited

U.S. PATENT DOCUMENTS

| 5,872,710 A | 2/1999 | Kameyama |
| 2011/0166750 A1* | 7/2011 | Nakano ................. B62D 5/046 701/41 |

(Continued)

FOREIGN PATENT DOCUMENTS

| JP | 10-164850 A | 6/1998 |
| JP | 2004201414 A | 7/2004 |

(Continued)

OTHER PUBLICATIONS

Written Opinion for PCT/JP2017/026202, dated Oct. 24, 2017.
International Search Report for PCT/JP2017/026202, dated Oct. 24, 2017.

*Primary Examiner* — Sze-Hon Kong
(74) *Attorney, Agent, or Firm* — Sughrue Mion, PLLC

(57) ABSTRACT

An electric power steering apparatus of a vector control system that compensates a dead time of an inverter without tuning operation, improves a distortion of a current waveform and a responsibility of a current control, and suppresses a steering sound, a vibration and a ripple. The apparatus converts dq-axes current command values calculated based on at least a steering torque into 3-phase voltage command values, converts the 3-phase voltage command values into duty command values, driving-controls a 3-phase brushless motor by an inverter of a PWM control, and applies an assist torque to a steering system of a vehicle, wherein 3-phase detection voltages are estimated based on 3-phase motor terminal voltages, wherein loss voltages due to a dead time of the inverter are estimated from differences between (Continued)

FIRST EMBODIMENT 3-phase command voltages calculated from the duty command values and the 3-phase detection voltages, and wherein a dead time compensation of the inverter is performed by feeding-back dead time compensation values obtained by compensating the loss voltages to the 3-phase voltage command values.

13 Claims, 17 Drawing Sheets

(51) Int. Cl.
    *H02P 21/05*     (2006.01)
    *H02P 21/13*     (2006.01)
    *B62D 6/00*     (2006.01)
    *B62D 6/10*     (2006.01)
    *H02M 1/38*     (2007.01)

(52) U.S. Cl.
    CPC .............. *H02P 21/05* (2013.01); *H02P 21/13* (2013.01); *H02M 2001/385* (2013.01)

(56) References Cited

U.S. PATENT DOCUMENTS

| | | | | |
|---|---|---|---|---|
| 2012/0057381 | A1* | 3/2012 | Kimpara | H02M 3/156 363/78 |
| 2015/0251692 | A1* | 9/2015 | Mikamo | B62D 5/0472 701/42 |
| 2016/0329853 | A1* | 11/2016 | Koseki | H02P 27/06 |
| 2017/0019052 | A1* | 1/2017 | Suzuki | B62D 5/04 |
| 2017/0070178 | A1* | 3/2017 | Koseki | H02P 27/06 |
| 2017/0259846 | A1* | 9/2017 | Koseki | H02P 29/0243 |
| 2017/0331405 | A1* | 11/2017 | Mori | H02P 21/22 |
| 2017/0369093 | A1* | 12/2017 | Kusatani | H02P 29/024 |
| 2018/0105201 | A1* | 4/2018 | Mori | H02P 23/00 |
| 2018/0175779 | A1* | 6/2018 | Koseki | H02P 27/06 |
| 2018/0191283 | A1* | 7/2018 | Aoyagi | H02P 21/0089 |
| 2018/0219497 | A1* | 8/2018 | Ghaderi | H02P 21/141 |
| 2018/0294755 | A1* | 10/2018 | Mori | H02P 21/18 |
| 2019/0023315 | A1* | 1/2019 | Takizawa | H02P 6/28 |
| 2019/0068098 | A1* | 2/2019 | Iijima | H02P 27/08 |

FOREIGN PATENT DOCUMENTS

| | | |
|---|---|---|
| JP | 2005-229717 A | 8/2005 |
| JP | 2010-068662 A | 3/2010 |
| JP | 4681453 B2 | 5/2011 |
| JP | 2015-171251 A | 9/2015 |

* cited by examiner

PRIOR ART

PRIOR ART

FIG.5 FIRST EMBODIMENT

ELECTRIC POWER STEERING APPARATUS

This Application is a National Stage of International Application No. PCT/JP2017/026202 filed Jul. 20, 2017, claiming priority based on Japanese Patent Application No. 2016-142625 filed Jul. 20, 2016, 2017-125084 filed Jun. 27, 2017 and 2017-131849 filed Jul. 5, 2017.

TECHNICAL FIELD

The present invention relates to an electric power steering apparatus that vector-controls a driving of a 3-phase brushless motor with a dq-axes rotational coordinate system, compensates a dead time of an inverter by feeding-back dead time compensation values based on 3-phase motor terminal voltages or a form adding an ideal dead time compensation model to the 3-phase motor terminal voltages, to the 3-phase voltage command values, and enables to smoothly assist-control without a steering sound.

BACKGROUND ART

An electric power steering apparatus (EPS) which provides a steering system of a vehicle with a steering assist torque (an assist torque) by a rotational force of a motor, applies the steering assist torque to a steering shaft or a rack shaft by means of a transmission mechanism such as gears by using a driving force of the motor which is controlled by electric power supplied from an electric power supplying section. In order to accurately generate the steering assist torque, such a conventional electric power steering apparatus performs a feed-back control of a motor current. The feed-back control adjusts a voltage supplied to the motor so that a difference between a steering assist command value (a current command value) and a detected motor current value becomes small, and the adjustment of the voltage supplied to the motor is generally performed by an adjustment of duty command values of a pulse width modulation (PWM) control.

A general configuration of the conventional electric power steering apparatus will be described with reference to FIG. 1. As shown in FIG. 1, a column shaft (a steering shaft or a handle shaft) 2 connected to a handle (a steering wheel) 1 is connected to steered wheels 8L and 8R through reduction gears 3, universal joints 4a and 4b, a pinion-and-rack mechanism 5, and tie rods 6a and 6b, further via hub units 7a and 7b. In addition, the steering shaft 2 is provided with a steering angle sensor 14 for detecting a steering angle θ and a torque sensor 10 for detecting a steering torque Th of the handle 1, and a motor 20 for assisting the steering torque of the handle 1 is connected to the column shaft 2 through the reduction gears 3. The electric power is supplied to a control unit (ECU) 30 for controlling the electric power steering apparatus from a battery 13, and an ignition key signal is inputted into the control unit 30 through an ignition key 11. The control unit 30 calculates a current command value of an assist command (a steering assist command) on the basis of the steering torque Th detected by the torque sensor 10 and a vehicle speed Vs detected by a vehicle speed sensor 12, and controls a current supplied to the motor by means of a voltage control command value Vref obtained by performing a compensation or the like for the calculated current command value. A steering angle sensor 14 is not indispensable and may not be provided. It is possible to obtain the steering angle (a motor rotational angle) θ from a rotational position sensor such as a resolver which is connected to the motor 20.

A controller area network (CAN) 40 to send/receive various information and signals on the vehicle is connected to the control unit 30, and it is also possible to receive the vehicle speed Vs from the CAN 40. Further, a Non-CAN 41 is also possible to connect to the control unit 30, and the Non-CAN 41 sends and receives a communication, analogue/digital signals, electric wave or the like except for the CAN 40.

In such an electric power steering apparatus, the control unit 30 mainly comprises a central processing unit (CPU) (including a micro processor unit (MPU) and a micro controller unit (MCU)), and general functions performed by programs within the CPU are, for example, shown in FIG. 2.

Functions and operations of the control unit 30 will be described with reference to FIG. 2. The steering torque Th from the torque sensor 10 and the vehicle speed Vs from the vehicle speed sensor 12 are inputted into a current command value calculating section 31. The current command value calculating section 31 calculates a current command value Iref1 based on the steering torque Th and the vehicle speed Vs using an assist map or the like. The calculated current command value Iref1 is added with a compensation signal CM for improving characteristics from a compensating section 34 at an adding section 32A. The current command value Iref2 after addition is limited of the maximum value thereof at a current limiting section 33. The current command value Irefm limited of the maximum value is inputted into a subtracting section 32B, whereat a detected motor current value Im is subtracted from the current command value Irefm.

The subtracted result ΔI (=Irefm−Im) at the subtracting section 32B is current-controlled such as a proportional-integral (PI) at a PI-control section 35. The voltage control value Vref obtained by the current control and a modulation signal (a triangle wave carrier) CF are inputted into a PWM-control section 36, whereat a duty thereof is calculated. The motor 20 is PWM-driven by an inverter 37 with a PWM signal calculated the duty. The motor current value Im of the motor 20 is detected by a motor current detection means 38 and is inputted into the subtracting section 32B for the feed-back.

The compensating section 34 adds a self-aligning torque (SAT) detected or estimated and an inertia compensation value 342 at an adding section 344. The added result is further added with a convergence control value 341 at an adding section 345. The added result is inputted into the adding section 32A as the compensation signal CM, thereby to improve the control characteristics.

Recently, a 3-phase brushless motor is mainly used as an actuator of the electric power steering apparatus, and since the electric power steering apparatus is on-vehicle products, the operating temperature range is wide. From a view point of a fail-safe, a dead time of the inverter to drive the motor needs greater than that for general industrial purposes that home appliances ("industrial equipment"<"EPS"). Generally, since a switching device (for example, a field-effect transistor (FET)) has a delay time when it is turned-OFF, a direct current link is shorted when the switching devices of an upper-arm and a lower-arm are simultaneously turned-ON or turned-OFF. In order to prevent the above problem, a time (a dead time) that the switching devices of both arms are turned-OFF, is set.

As a result, a current waveform is distorted, and a responsibility of the current control and a steering feeling go down. For example, in a state that the handle is near on-center of the steering, a discontinuous steering feeling and the like due to the torque ripple are occurred. Since the back-EMF (electromotive force) voltage of the motor in a while speed steering or a high speed steering, and the interference voltage between the windings operate as the disturbance against the current control, a steering follow-up performance and the steering feeling in the turn-back steering are badly affected.

A q-axis to control the torque being the coordinate axis of a rotor of the 3-phase brushless motor and a d-axis to control the magnetic field strength are independently set and has a relation that the d-axis and the q-axis is 90°. Thus, a vector control system to control the currents (the d-axis current command value and the q-axis current command value) corresponding to respective axes with the vector, is known.

FIG. 3 shows a configuration example in a case that a 3-phase brushless motor 100 is driving-controlled by the vector control system. A d-axis current command value $i_d^*$ and a q-axis current command value $i_q^*$, which are calculated at the current command value calculating section (not shown) based on the steering torque Th, the vehicle speed Vs and so on, of a dq-axes coordinate system of two axes are respectively inputted into subtracting sections 131d and 131q, and current deviations $\Delta i_d^*$ and $\Delta i_q^*$ obtained in the subtracting sections 131d and 131q are respectively inputted into PI-control sections 120d and 120q. Voltage command values $v_d$ and $v_q$ PI-controlled at the PI-control sections 120d and 120q are respectively inputted into a subtracting section 141d and an adding section 141q, and command voltages $\Delta v_d$ and $\Delta v_q$ obtained at the subtracting section 141d and the adding section 141q are inputted into a dq-axes/3-phase alternating current (AC) converting section 150. Voltage command values $V_u^*$, $V_v^*$ and $V_w^*$ converted into three phases at the dq-axes/3-phase AC converting section 150 are inputted into a PWM-control section 160, and the motor 100 is driven with PWM-signals $U_{PWM}$, $V_{PWM}$, $W_{PWM}$ based on calculated 3-phase duty command values ($Duty_u$, $Duty_v$, $Duty_w$) via the inverter (inverter-applying voltage VR) 161 constituted by a bridge configuration of an upper-arm and a lower-arm as shown in FIG. 4. The upper-arm comprises FETs Q1, Q3, Q5 and the lower-arm comprises FETs Q2, Q4, Q6 serving as switching devices.

3-phase motor currents $i_u$, $i_v$ and $i_w$ of the motor 100 are detected by current detectors 162, and the detected 3-phase motor currents $i_u$, $i_d$ and $i_w$ are inputted into the 3-phase AC/dq-axes converting section 130. The 2-phase feed-back current $i_d$ and $i_q$ that are converted at the 3-phase AC/dq-axes converting section 130 are respectively subtraction-inputted into subtracting sections 131d and 131q, and further inputted into a d-q non-interference control section 140. 2-phase voltages $v_{d1}^*$ and $v_{q1}^*$ from the d-q non-interference control section 140 are respectively inputted into the subtracting section 141d and the adding section 141q, and the command voltages $\Delta v_d$ and $\Delta v_q$ are calculated at the subtracting section 141d and the adding section 141q. The command voltages $\Delta v_d$ and $\Delta v_q$ are inputted into the dq-axes/3-phase AC converting section 150, and the motor 100 is driven via the PWM-control section 160 and the inverter 161.

Further, a rotational sensor or the like is attached to the motor 100, and a motor rotational angle θ and a motor rotational number (velocity) ω are outputted from an angle detecting section 110 to process the sensor signal. The motor rotational angle θ is inputted into the dq-axes/3-phase AC converting section 150 and the 3-phase AC/dq-axes converting section 130, and the motor rotational number ω is inputted into the d-q non-interference control section 140.

The electric power steering apparatus of the vector control system described above is an apparatus to assist a steering of a driver, and also a sound and a vibration of the motor, a torque ripple and the like are transmitted to the driver as a force sense via the steering wheel. The FETs are generally used as power devices to drive the inverter, and the current is applied to the motor. In a case that the 3-phase motor is used, FETs, which are connected in series for respective phases, of the upper-arm and the lower-arm are used as shown in FIG. 4. Although the FETs of the upper-arm and the lower-arm are alternatively turned-ON and turned-OFF, the FET does not simultaneously turn-ON and turn-OFF in accordance with a gate signal since the FET is not an ideal switching device. Therefore, a turn-ON time and a turn-OFF time are needed. Consequently, if an ON-command for the upper-arm FET and an OFF-command for the lower-arm FET are simultaneously inputted, there is a problem that the upper-arm FET and the lower-arm FET simultaneously turn-ON and the upper-arm and the lower-arm become short circuits. There is a difference between the turn-ON time and the turn-OFF time of the FET. Thus, when the command is inputted into the FETs at the same time, the FET immediately turns-ON in a case that the turn-ON time is short (for example, 100 [ns]) by inputting the ON-command to the upper-FET, and reversely, the FET does not immediately turn-OFF in a case that the turn-OFF time is long (for example, 400 [ns]) by inputting the OFF-command to the lower-FET. In this way, a state (for example, between 400 [ns]–100 [ns], ON-ON) that the upper-FET is "ON" and the lower FET is "ON", often momentarily occurs.

In this connection, in order that the upper-arm FET and the lower-arm FET do not simultaneously turn-ON, the ON-signal is usually given to the gate driving circuit with a predetermined period being a dead time. Since the dead time is nonlinear, the current waveform is distorted, the responsibility of the control is badly affected and the sound, the vibration and the torque ripple are generated. In a column type electric power steering apparatus, since an arrangement of the motor directly connected to a gear box which is connected by the handle and the column shaft made of steel is extremely near the driver in the mechanism, it is necessary to especially consider the sound, the vibration, the torque ripple and the like due to the motor in comparison with a downstream type electric power steering apparatus.

Conventionally, as a method to compensate the dead time of the inverter, there are methods to add the compensation value to the dead time by detecting a timing occurring the dead time and to compensate the dead time by using a disturbance observer on the dq-axes in the current control.

The electric power steering apparatus to compensate the dead time is disclosed in, for example, Japanese Patent No. 4681453 B2 (Patent Document 1) and Japanese Unexamined Patent Publication No. 2015-171251 A (Patent Document 2). In Patent Document 1, there is provided a dead band compensation circuit that generates a model current based on the current command values by inputting the current command values into a reference model circuit of the current control loop including the motor and the inverter, and compensates the influence of the dead time of the inverter based on the model current. Further, in Patent Document 2, there is provided a dead time compensating section to correct based on the dead time compensation value for the duty command value, and the dead time compensating section comprises a basic compensation value calculating section to calculate a basic compensation value being a basic value of the dead time compensation value based on the current command value and a filtering section to perform a filtering-process corresponding to a low pass filter (LPF) for the basic compensation value.

THE LIST OF PRIOR ART DOCUMENTS

Patent Documents

Patent Document 1: Japanese Patent No. 4681453 B2
Patent Document 2: Japanese Unexamined Patent Publication No. 2015-171251 A

SUMMARY OF THE INVENTION

Problems to be Solved by the Invention

The apparatus disclosed in Patent Document 1 is a system that estimates the compensation sign by using a calculation of the dead time compensation amount due to the q-axis current command value and the 3-phase current reference model. The output value of the compensation circuit is a changing value in proportion to the model current in a region being a predetermined fixed value or less, and is an addition value of the changing values in proportion to the fixed value and the model current in a region being the predetermined fixed value or more. In this way, the output value of the compensation circuit is outputted from the current command to the voltage command. However, the tuning operation for determining the hysteresis characteristic to output the predetermined fixed value is necessary.

Further, in the apparatus disclosed in Patent Document 2, when the dead time is determined, the dead time compensation is performed by using the q-axis current command value and the compensation value LPF-processed the q-axis current command value. Thus, the delay occurs, and there is a problem that the dead time compensation value is not operated for the final voltage command to the motor.

In the feed-forward type dead time compensation (an angle feed-forward type, a current command value model type), since the current flows in the motor with an exclusive software by locking the motor output shaft, the necessary dead time compensation amount is needed to measure by using the actual machine. The tuning operation of the threshold value for determining the compensation sign due to the phase adjustment and the current command value by rotating a single motor under a constant load and a constant rotation number by using a motor test apparatus, is required. It is necessary to allot the inverter-applying voltage and the motor rotational number and to perform plural times, and therefore the mitigation of the tuning operation is required.

Further, in the feed-forward type dead time compensation, the chattering occurs near a zero-cross point or at the low load and low speed steering maneuver in a case that the sign is not switched with an appropriate compensation amount and an appropriate timing. By inputting the dead time compensation that the compensation amount is unsuitable or the dead time compensation that the timing is unsuitable, there is a case that the chattering is often caused by the control itself. In the feed-forward type dead time compensation, in order to suppress the above chattering, a quite accurate tuning operation such as various ideas and the strict switching of the compensation sign are needed.

The present invention has been developed in view of the above-described circumstances, and an object of the present invention is to provide the electric power steering apparatus of the vector control system that compensates the dead time of the inverter without the tuning operation, improves the distortion of the current waveform and the responsibility of the current control, and suppresses the steering sound, the vibration and the torque ripple.

Means for Solving the Problems

The present invention relates to an electric power steering apparatus of a vector control system that converts dq-axes current command values calculated based on at least a steering torque into 3-phase voltage command values, converts the 3-phase voltage command values into duty command values, driving-controls a 3-phase brushless motor by an inverter of a pulse width modulation (PWM) control, and applies an assist torque to a steering system of a vehicle, the above-described object of the present invention is achieved by that: wherein 3-phase detection voltages are estimated based on 3-phase motor terminal voltages, wherein loss voltages due to a dead time of the inverter are estimated from differences between 3-phase command voltages calculated from the duty command values and the 3-phase detection voltages, and wherein a dead time compensation of the inverter is performed by feeding-back dead time compensation values obtained by compensating the loss voltages to the 3-phase voltage command values.

Further, the present invention relates to an electric power steering apparatus of a vector control system that converts dq-axes current command values calculated based on at least a steering torque into 3-phase voltage command values, converts the 3-phase voltage command values into duty command values, driving-controls a 3-phase brushless motor by an inverter of a PWM control, and applies an assist torque to a steering system of a vehicle, the above-described object of the present invention is achieved by that: comprising a spatial vector modulating section to spatial-vector-modulate the dq-axes current command values and obtain the 3-phase voltage command values; a midpoint voltage estimating section to estimate midpoint voltages based on 3-phase motor terminal voltages, a motor rotational angle, a motor rotational number and an inverter-applying voltage; a 3-phase detection voltage calculating section to calculate 3-phase detection voltages from the midpoint voltages and the 3-phase motor terminal voltages; a 3-phase command voltage calculating section to calculate 3-phase command voltages based on the duty command values and the inverter-applying voltage; a 3-phase loss voltage calculating section to estimate loss voltages due to a dead time of the inverter from differences between the 3-phase detection voltages and the 3-phase command voltages; and a compensation value limiting section to limit the dead time compensation values by making 3-phase loss voltages calculated at the 3-phase loss voltage calculating section be sensitive to the inverter-applying voltage, wherein a dead time compensation of the inverter is performed by adding the limited dead time compensation values to the 3-phase voltage command values.

Furthermore, the present invention relates to an electric power steering apparatus of a vector control system that converts dq-axes current command values calculated based on at least a steering torque into 3-phase duty command values, driving-controls a 3-phase brushless motor by an inverter of a PWM control, and applies an assist torque to a steering system of a vehicle, the above-described object of the present invention is achieved by that: wherein 3-phase detection voltages are estimated based on 3-phase motor terminal voltages, wherein loss voltages due to a dead time of the inverter are estimated from differences between 3-phase command voltages calculated from the duty command values and the 3-phase detection voltages, wherein the calculated loss voltages are set as a basic compensation amount, wherein voltage differences between ideal dead time compensation values and the loss voltages, which are a shortage compensation amount, are corrected, and wherein a dead time compensation of the inverter is performed by feeding-back corrected 3-phase values as dead time compensation values to the 3-phase voltage command values.

The present invention relates to an electric power steering apparatus of a vector control system that converts a d-axis current command value and a q-axis current command value calculated based on at least a steering torque into 3-phase voltage command values, driving-controls a 3-phase brushless motor by an inverter of a PWM control using calculated 3-phase duty command values, and applies an assist torque to a steering system of a vehicle, the above-described object of the present invention is achieved by that: comprising a midpoint voltage estimating section to estimate midpoint voltages based on 3-phase motor terminal voltages, a motor rotational angle, a motor rotational number and an inverter-applying voltage; a 3-phase detection voltage calculating section to calculate 3-phase detection voltages from the midpoint voltages and the 3-phase motor terminal voltages; a 3-phase command voltage calculating section to calculate 3-phase command voltages based on the 3-phase duty command values and the inverter-applying voltage; a loss voltage calculating section to estimate 3-phase loss voltages due to a dead time of the inverter from differences between the 3-phase detection voltages and the 3-phase command voltages; an ideal dead time compensation model to obtain 3-phase ideal dead time compensation values based on the motor rotational angle, the motor rotational number and the inverter-applying voltage; a correcting section to correct voltage differences between the 3-phase loss voltages and the 3-phase ideal dead time compensation values based on the q-axis current command value; and an outputting section to output 3-phase dead time compensation values by processing compensation values from the correcting section based on the inverter-applying voltage, wherein a dead time compensation of the inverter is performed by feeding-back the 3-phase dead time compensation values to the 3-phase voltage command values.

Effects of the Invention

The electric power steering apparatus according to the present invention estimates the 3-phase voltages from the 3-phase motor terminal voltages, calculates the 3-phase applying voltages from the 3-phase duty command values and the inverter-applying voltage, obtains the differences between the 3-phase command voltages and the 3-phase applying voltages, and then calculates the loss voltages lost due to the dead time. The calculated loss voltages are worked as the compensation amount, the electric power steering apparatus processes to limit the compensation amount or processes to limit the compensation amount with reference to the differences between ideal dead time compensation values and the loss voltages, which are a shortage compensation amount, in a case that a transitional difference voltage occurs due to the midpoint correction of the compensation amount, the motor back-EMF, noises and the like, and compensates the dead time by feeding-back the limited compensation amount to the 3-phase spatial-vector-modulated voltage command values as the dead time compensation values.

Further, since the compensation sign and the compensation amount are automatically calculated, the chattering does not occur even in the low load and a low speed steering region near the on-center of the handle, and it is possible to compensate the dead time. Since the automatic calculation is performed even when the 3-phase compensation waveforms are not rectangular wave, it is also possible to compensate the dead time.

In the motor terminal voltage feed-back type according to the present invention, since the nearly ideal compensation and the optimal compensation sign almost without the tuning operation are used for the calculation in the particular steering region, ingenious attempts to suppress the occurrence of the chattering are limited in comparison with the feed-forward type. However, the dead time compensation can effectively be used near the zero-cross region and in the low load and low speed steering region for suppressing the risk (the chattering occurred by the control itself).

As well, in the dead time compensation of the terminal voltage feed-back type, "92 [%] to 95 [%]" of the compensation amount measured by using the exclusive software from the difference between the estimated applying voltage and the detected voltage in the zero-cross region and the low load and low speed steering region near the on-center, is calculated. Further, about the compensation sign, the appropriate direction is calculated from the difference between the voltages. In the feed-forward type, it is necessary to previously measure with the exclusive software and to perform the tuning by the motor test apparatus. On the contrary, in the feed-back type, the measurable compensation amount and the compensation sign are obtained by the calculation without the rewrite for the test software and the tuning with the test apparatus automatically to some extent.

MODE FOR CARRYING OUT THE INVENTION

In order to resolve a problem that a current distortion and a torque ripple occur due to an influence of a dead time of an inverter in a control unit (ECU) and a steering sound is louder, the present invention estimates 3-phase voltages from 3-phase motor terminal voltages, calculates 3-phase command voltages from 3-phase duty command values and an inverter-applying voltage, and calculates loss voltages lost due to the dead time by obtaining differences via a delay model. The calculated 3-phase loss voltages are appropriately processed as a compensation amount, or the shortage compensation amount is appropriately processed based on the differences between the ideal dead time compensation values and the loss voltages, and the present invention has a configuration to perform the dead time compensation by feeding-back the dead time compensation values to the 3-phase space-vector-modulated voltage command values.

The present invention judges a disturbance such as a motor back-EMF (electromotive force) in a case that the compensation values exceeding the upper limit value are detected from the detected loss voltages, and calculates losses due to the dead time by limiting the compensation values. It is possible to perform the dead time compensation even on the 3-phase signals by directly feeding-back the calculated loss voltages to the 3-phase voltage command values as the dead time compensation values.

Embodiments according to the present invention will be described with reference to the drawings.

Figure 1:
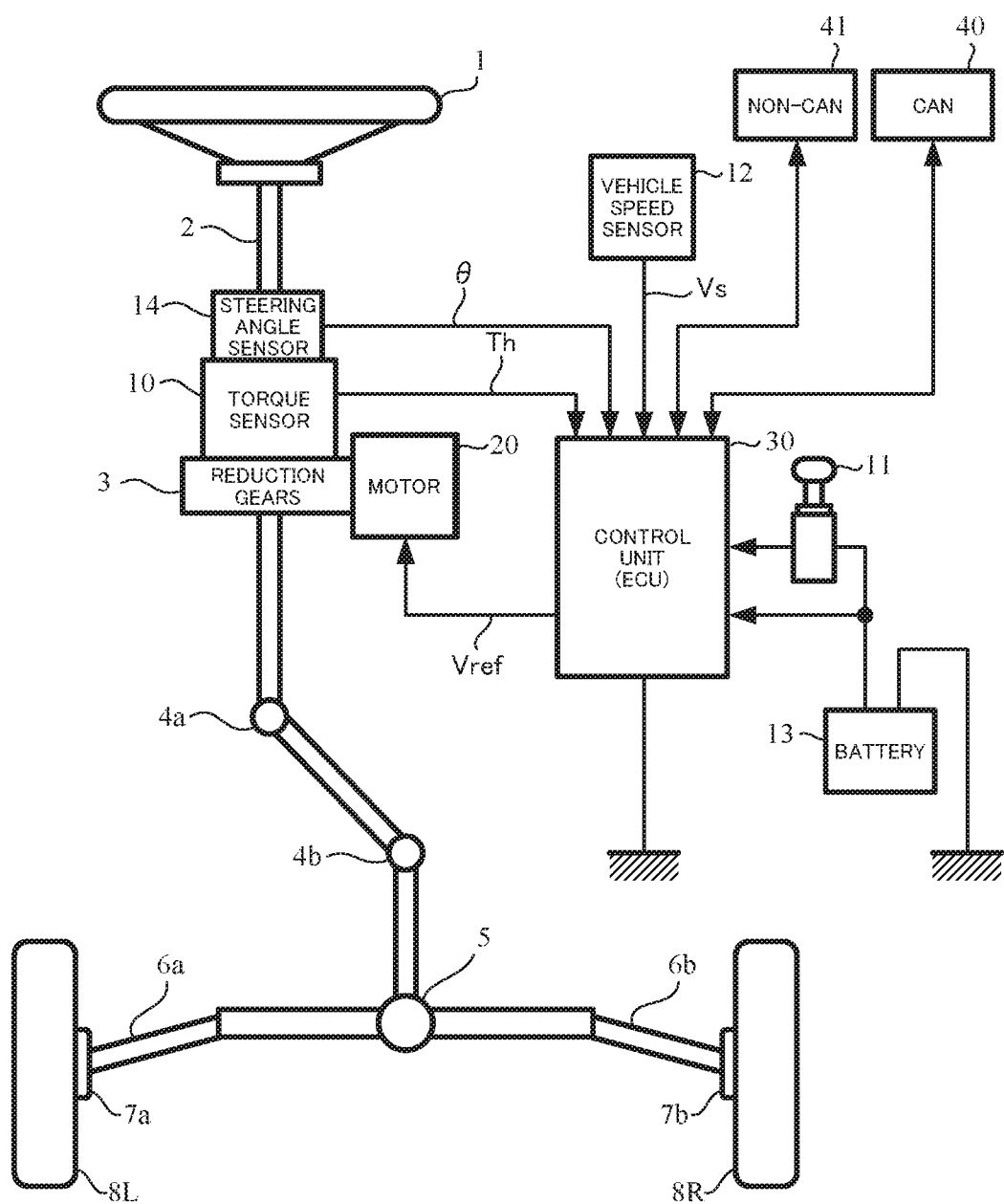
FIG. 1 is a configuration diagram showing a general outline of an electric power steering apparatus.
Figure 2:
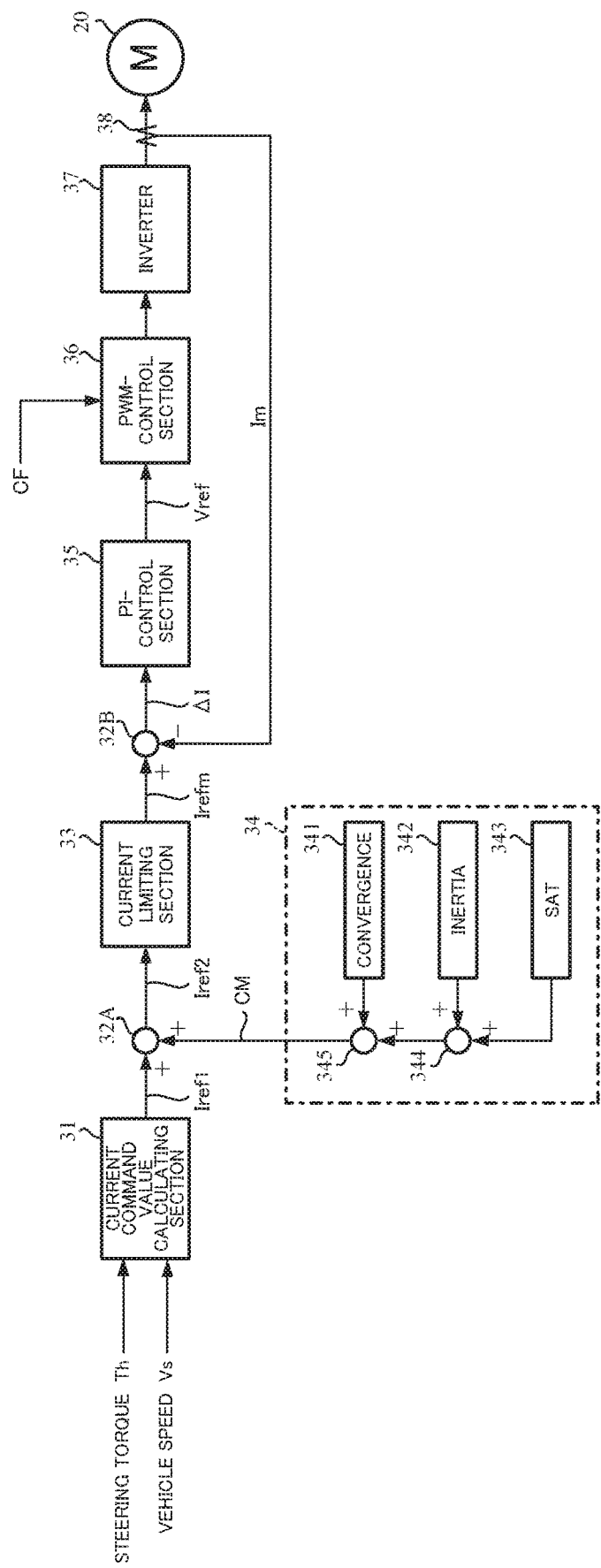
FIG. 2 is a block diagram showing a configuration example of a control unit (ECU) of the electric power steering apparatus.
Figure 3:
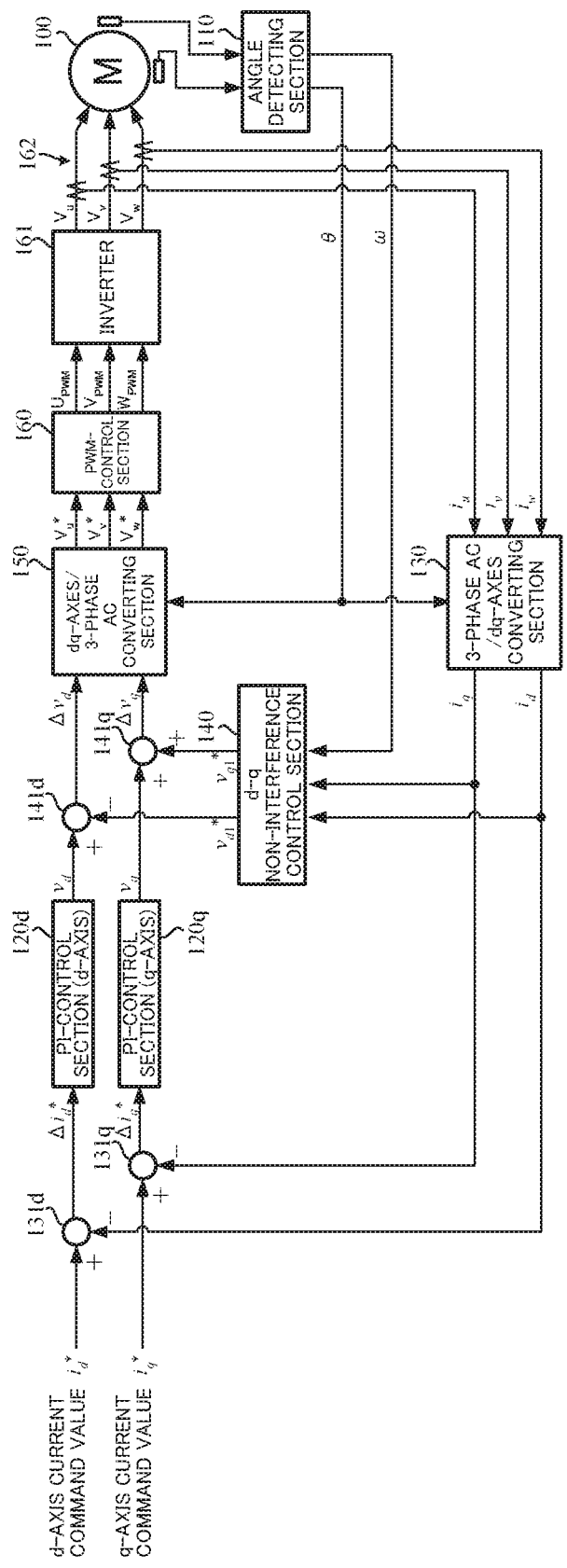
FIG. 3 is a block diagram showing a configuration example of a vector control system.
Figure 4:
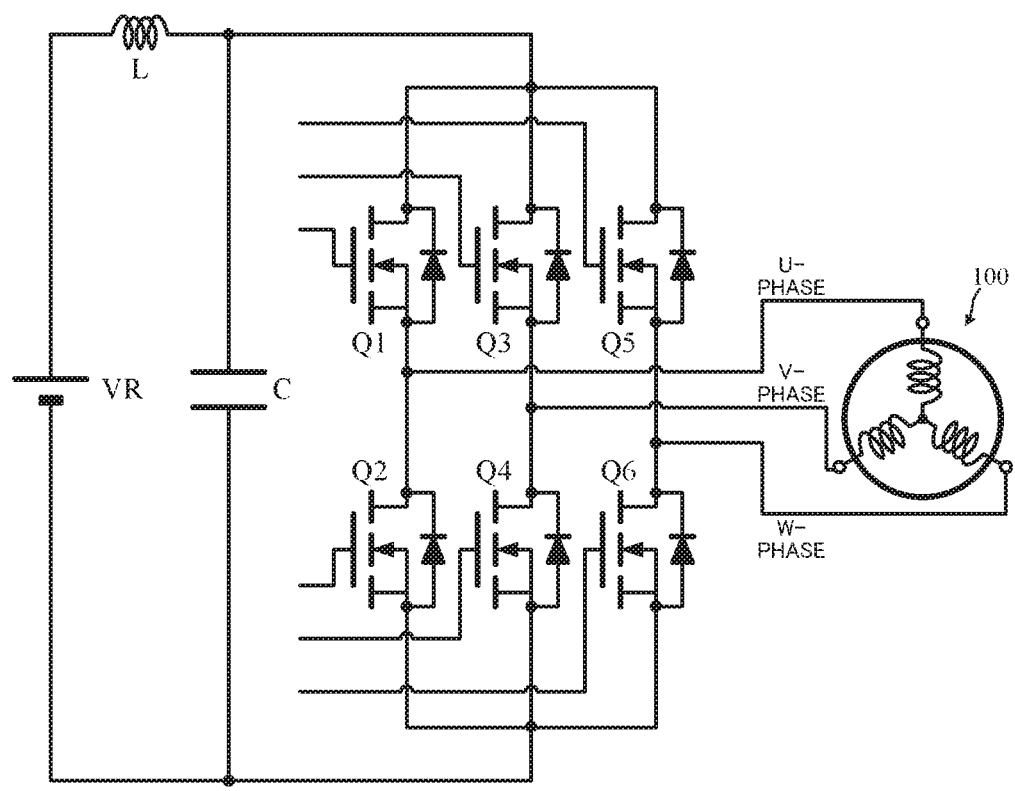
FIG. 4 is a wiring diagram showing a configuration example of a general inverter.
Figure 5:
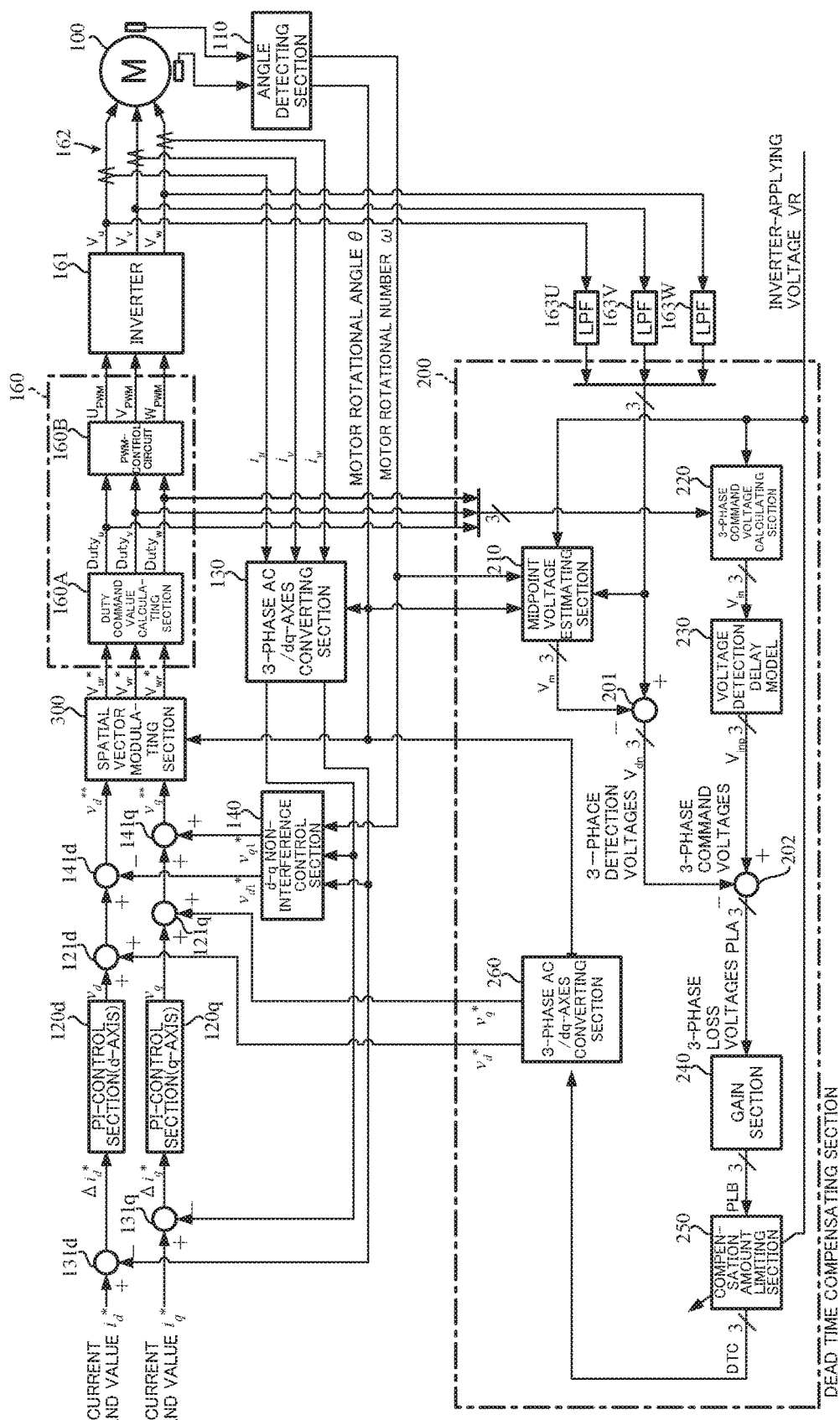
FIG. 5 is a block diagram showing a configuration example (the first embodiment) of the present invention.

FIG. 5 shows a whole configuration example (the first embodiment) of the present invention corresponding to FIG. 3, and there is provided a dead time compensating section 200 to calculate dead time compensation values $v_d^*$ and $v_q^*$ on the dq-axes. A motor rotational angle θ and a motor rotational number w are inputted into the dead time compensating section 200, and further 3-phase duty command values $Duty_u$, $Duty_v$ and $Duty_w$ calculated at a duty command value calculating section 160A in a PWM-control section 160 and 3-phase motor terminal voltages $V_u$, $V_v$ and $V_w$ of the motor 100 are inputted into the dead time compensating section 200. The 3-phase motor terminal voltages $V_u$, $V_v$ and $V_w$ are inputted into the dead time compensating section 200 via low pass filters (LPFs) 163U, 163V and 163W for removing a high frequency noise, respectively. Further, PWM-signals ($U_{PWM}$, $V_{PWM}$, $W_{PWM}$) from a PWM-control circuit 160B in the PWM-control section 160 are inputted into an inverter 161, and an inverter-applying voltage VR applied to the inverter 161 is inputted into the dead time compensating section 200.

A d-axis current command value $i_d$ and a q-axis current command value $i_q^*$ calculated at a current command value calculating section (not shown) are respectively inputted into subtracting sections 131d and 131q, and current deviations $\Delta i_d^*$ and $\Delta i_q^*$ for the feed-back currents $i_d$ and $i_q$ are respectively calculated at the subtracting sections 131d and 131q. The calculated current deviation $\Delta i_d^*$ is inputted into the PI-control section 120d, and the calculated current deviation $\Delta i_q^*$ is inputted into the PI-control section 120q. The PI-controlled d-axis voltage command value $v_d$ and q-axis voltage command value $v_q$ are respectively inputted into the adding sections 121d and 121q, the dead time compensation values $v_d^*$ and $v_q^*$ from the dead time compensating section 200 described below are added and compensated in the adding section 121d and 121q, and the compensated voltage values are respectively inputted into the subtracting section 141d and the adding section 141q. The voltage $v_{d1}^*$ from the d-q non-interference control section 140 is inputted into the subtracting section 141d, and the voltage command value $v_d^{**}$ being the difference is obtained. The voltage $v_{q1}^*$ from the d-q non-interference control section 140 is inputted into the adding section 141q, and the voltage command value $v_q^{}$ being the added result is obtained. The voltage command values $v_d^{}$ and $v_q^{**}$ which are dead time-compensated are inputted into a spatial vector modulating section 300 that converts 2-phase values on the dq-axes into 3-phases values U-phase, V-phase and W-phase and superimposes a third-harmonic. 3-phase voltage command values $V_{ur}^*$, $V_{vr}^*$ and $V_{wr}^*$, vector-modulated at the spatial vector modulating section 300 are inputted into the PWM-control section 160, and the motor 100 is driving-controlled via the PWM-control section 160 and the inverter 161 as described above.

Next, the dead time compensating section 200 will be described.

The dead time compensating section 200 comprises subtracting sections 201 (201U, 201V and 201W) and 202, a midpoint voltage estimating section 210, a 3-phase command voltage calculating section 220, a voltage detection delay model 230, a gain section 240, a compensation amount limiting section 250 and a 3-phase alternating current (AC)/dq-axes converting section 260.

Figure 6:
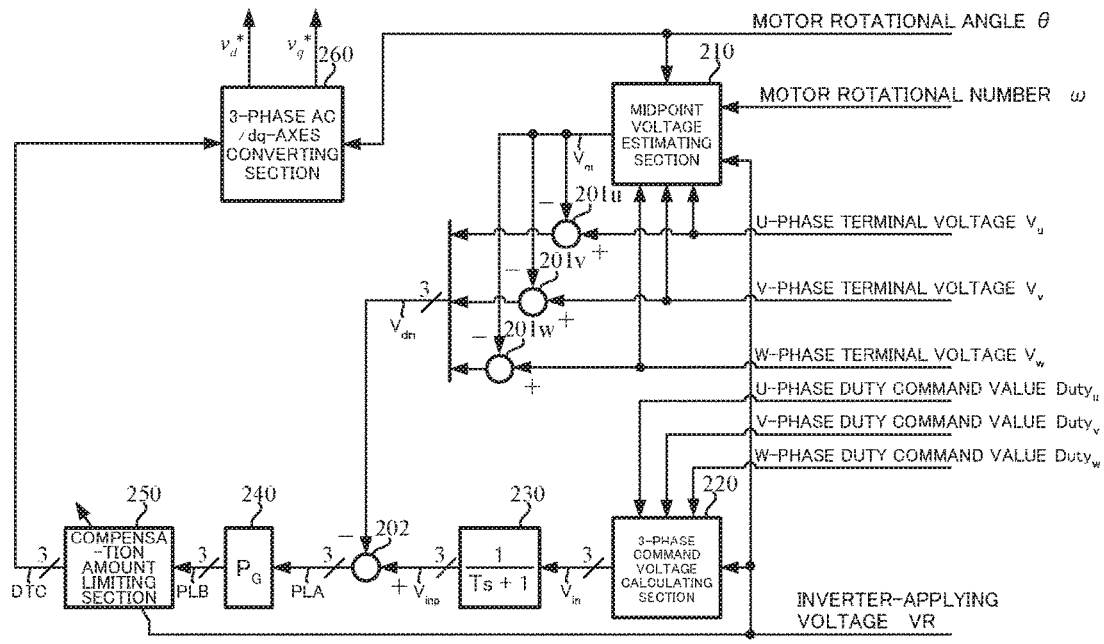
FIG. 6 is a block diagram in details showing a configuration example a dead time compensating section according to the first embodiment.

The detail configuration is shown in FIG. 6, the motor rotational angle θ is inputted into the midpoint voltage estimating section 210 and the 3-phase AC/dq-axes converting section 260, and the motor rotational number w is inputted into the midpoint voltage estimating section 210. The motor terminal voltages $V_u$, $V_v$ and $V_w$ are inputted into the midpoint voltage estimating section 210 and the subtracting section 201 (201U, 201V and 201W) via LPFs 163U, 163V and 163W. Further, the 3-phase duties $Duty_u$, $Duty_v$ and $Duty_w$ from the duty command value calculating section 160A in the PWM-control section 160 are inputted into the 3-phase command voltage calculating section 220, and the inverter-applying voltage VR is inputted into the midpoint voltage estimating section 210, the 3-phase command voltage calculating section 220 and the compensation amount limiting section 250.

Figure 7:
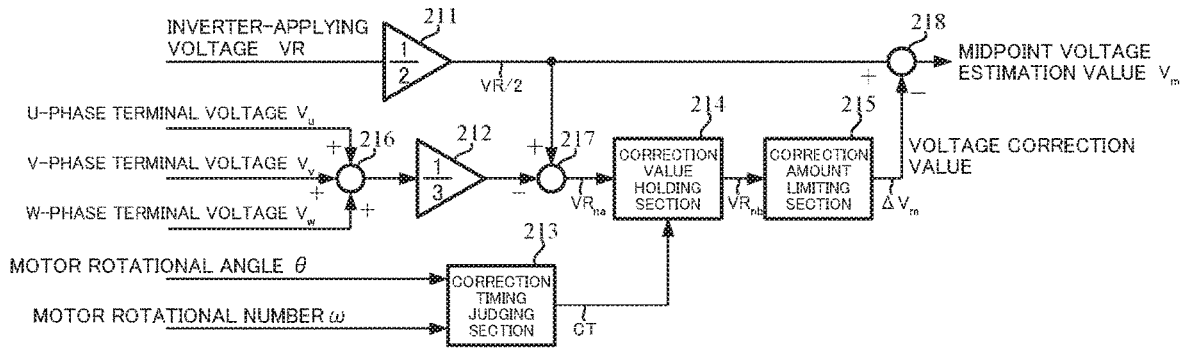
FIG. 7 is a block diagram showing a configuration example of the midpoint voltage estimating section.

The midpoint voltage estimating section 210 calculates a reference voltage of midpoint voltages by using the inverter-applying voltage VR. The detail configuration is shown in FIG. 7, since the midpoint voltages vary depending on the influence of a hardware configuration, a detection error and so on, the correction is performed based on the differences between the inverter-applying voltage VR and the motor terminal voltages $V_u$, $V_v$ and $V_w$. The correction timing is adjusted under conditions of a specific motor rotational angle θ and a specific motor rotational number w.

That is, the inverter-applying voltage VR is reduced by half (VR/2) at a reducing section 211, and a reduced value (VR/2) is addition-inputted into subtracting sections 217 and 218. The motor terminal voltages $V_u$, $V_v$ and $V_w$ are inputted into the adding section 216 and are added, the added result "$V_u+V_v+V_w$" is ⅓-multiplied at a dividing section (⅓) 212, and a ⅓-multiplied voltage "$(V_u+V_v+V_w)/3$" is subtraction-inputted into the subtracting section 217. The subtracting section 217 subtracts the voltage "$(V_u+V_v+V_w)/3$" from the reduced value VR/2, and the subtracted value $VR_{na}$ is inputted into a correction value holding section 214. A correction timing judging section 213 judges a correction timing based on the motor rotational angle θ and the motor rotational number w and inputs a correction signal CT to the correction value holding section 214. The correction amount limiting section 215 calculates a correction amount $\Delta V_m$ based on a voltage $VR_{nb}$ held in the correction value holding section 214.

Figure 8:
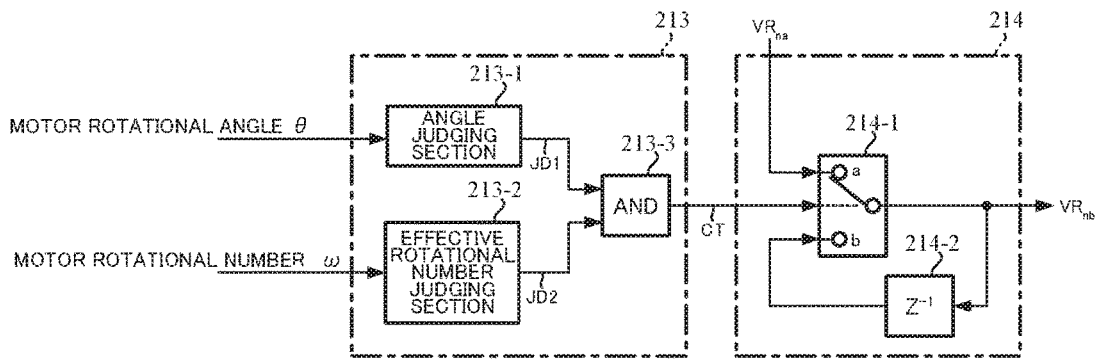
FIG. 8 is a block diagram showing a detail configuration example of the correction timing judging section and the correction value holding section.

The details of the correction timing judging section 213 and the correction value holding section 214 are shown in FIG. 8, the correction timing judging section 213 comprises an angle judging section 213-1, an effective rotational number judging section 213-2 and an AND-circuit 213-3, and the correction value holding section 214 comprises a switching section 214-1 and a holding unit ($Z^{-1}$) 214-2.

That is, the motor rotational angle θ is inputted into the angle judging section 213-1 and the judgment is performed by using the below Expression 1. When the Expression 1 is established, the angle judging section 213-1 outputs a judging signal JD1.

$$179[deg]<\theta<180[deg] \quad \text{[Expression 1]}$$

In a case that the timing of the above Expression 1 is considered as the correction condition on the calculation of the midpoint correction value, it is possible to accurately sample a voltage value of a zero-cross point. Since the third harmonic is superimposed on the motor terminal voltages except for the above point, it is impossible to detect more accurate value. For example, considering that the respective terminal voltages detected by the condition of the Expression 1 are $V_u$=6.83 [V], $V_v$=7.55 [V], $V_w$=5.94 [V] and the motor-applying voltage is 13.52 [V], "$(V_u+V_v+V_w)/3$"=6.77 [V] and VR/2=6.76[V] are established, and therefore "VR/2 $(V_u+V_v+V_w)/3$", the almost midpoint voltage is obtained. Further, when the motor rotational number w is high, since the influence of the motor back-EMF increases and the sampling precision decreases, it is impossible to perform the accurate correction calculation. Thus, the effective rotational number judging section 213-2 judges whether the motor rotational number ω is equal to or less than an effective rotational number $ω_0$ being capable of correction-calculating, or not. When the motor rotational number ω is equal to or less than the effective rotational number $ω_0$, the effective rotational number judging section 213-2 outputs the judging signal JD2.

$$ω \leq ω_0 \quad \text{[Expression 2]}$$

The judging signals JD1 and JD2 are inputted into the AND-circuit 213-3, and the correction signal CT is outputted in accordance with the AND-condition that the judging signals JD1 and JD2 are inputted. The correction signal CT is inputted into the switching section 214-1 in the correction value holding section 214 as a switching signal and switches contact points "a" and "b". The subtracted result $VR_{na}$ is inputted into the contact point "a", and the output voltage $VR_{nb}$ is inputted into the contact point "b" via the holding unit ($Z^{-1}$) 214-2. The correction value holding section 214 holds a value in order to output a stable correction value till a next timing. Further, in a case that the correction amount is clearly greater than a normal value due to the noise, the back-EMF, the correction timing miss-judgment and so on, the correction amount limiting section 215 judges that the present correction amount is not right and limits the maximum value. The maximum limited voltage correction value $\Delta V_m$ is inputted into the subtracting section 218, and the midpoint voltage estimation value $V_m$ calculated in accordance with the below Expression 3 at the subtracting section 218 is outputted. The midpoint voltage estimation value $V_m$ is subtraction-inputted into the subtracting section 201 (201U, 201V and 201W).

$$V_m = \frac{VR}{2} - \Delta V_m \quad \text{[Expression 3]}$$

Furthermore, the 3-phase duty command values $Duty_u$, $Duty_v$ and $Duty_w$ and the inverter-applying voltage VR are inputted into the 3-phase command voltage calculating section 220, and the 3-phase command voltage calculating section 220 calculates the 3-phase command voltages $V_{in}$ by using the below Expression 4 in accordance with the 3-phase duty command values $Duty_u$, $Duty_v$ and $Duty_w$ and the inverter-applying voltage VR. The 3-phase command voltages $V_{in}$ are inputted into the voltage detection delay model 230. As well, "$Duty_{ref}$" in the Expression 4 denotes $Duty_u$, $Duty_v$ and $Duty_w$.

$$V_{in} = VR \times \frac{(Duty_{ref} - Duty_{50\%})}{Duty_{100\%}} \quad \text{[Expression 4]}$$

The midpoint estimation value $V_m$ is subtraction-inputted into the subtracting section 201 (201U, 201V and 201W), and further the 3-phase terminal voltages $V_u$, $V_v$ and $V_w$ passed the LPFs 163U, 163V and 163W are subtraction-inputted into the subtracting section 201 (201U, 201V and 201W). The subtracting sections 201U, 201V and 201W subtract the midpoint estimation value $V_m$ from the 3-phase motor terminal voltages $V_u$, $V_v$ and $V_w$ in accordance with the below Expression 5. Thereby, 3-phase detection voltages $V_{dn}$ ($V_{du}$, $V_{dv}$ and $V_{dw}$) are obtained. The 3-phase detection voltages $V_{dn}$ ($V_{du}$, $V_{dv}$ and $V_{dw}$) are inputted into the subtracting section 202 serving as a 3-phase loss voltage calculating section.

$$V_{du}=V_u-V_m$$

$$V_{dv}=V_v-V_m$$

$$V_{dw}=V_w-V_m \quad \text{[Expression 5]}$$

The detection of the 3-phase terminal voltages $V_u$, $V_v$ and $V_w$ has a delay due to a noise filter or the like in the ECU.

Consequently, in a case that the loss voltages are directly calculated by obtaining the differences between the 3-phase command value voltages $V_{in}$ and the 3-phase detection voltages $V_{dn}$, the error occurs due to the phase difference. In order to resolve this problem, the present embodiment approximates the detection delay of the hardware such as a filter circuit as a first order filter model and improves the phase difference. The voltage detection delay model 230 of the present embodiment is a primary filter of the below Expression 6 and "T" denotes a filter time constant. The voltage detection delay model 230 may be a model of a secondary filter or higher order filter.

$$\frac{1}{Ts+1}$$ [Expression 6]

The 3-phase command voltages $V_{inp}$ from the voltage detection delay model 230 are addition-inputted into the subtracting section 202, and the 3-phase detection voltages $V_d$ are subtraction-inputted into the subtracting section 202. The 3-phase loss voltages PLA ($V_{loss\_n}$) are calculated by subtracting the 3-phase detection voltages $V_{dn}$ from the 3-phase command voltages $V_{inp}$. That is, the subtracting section 202 performs the below Expression 7.

$$V_{loss\_u} = V_{inu} - V_{du}$$

$$V_{loss\_v} = V_{inv} - V_{dv}$$

$$V_{loss\_w} = V_{inw} - V_{dw}$$ [Expression 7]

The 3-phase loss voltages PLA ($V_{loss\_n}$) are multiplied with a gain $P_G$ (for example, "0.8") at the gain section 240, and the 3-phase loss voltages PLA multiplied with the gain $P_G$ are inputted into the compensation amount limiting section 250. Although the gain $P_G$ is not basically needed to adjust, the gain $P_G$ is changed in a case that an output adjustment is needed when the matching for another compensating members, an actual vehicle tuning and parts of the ECU are changed.

Figure 9:
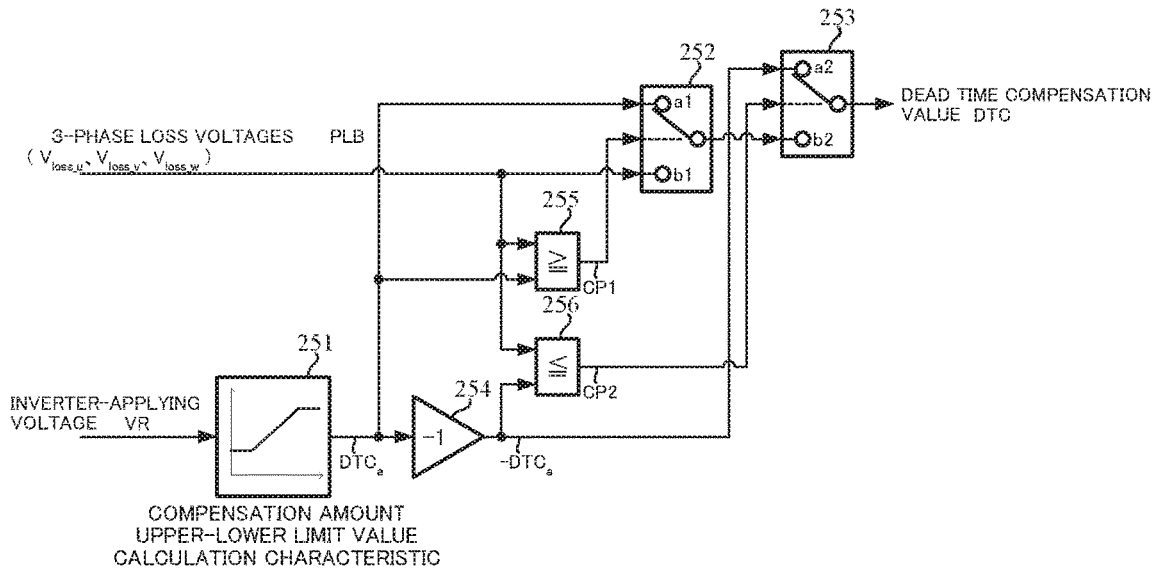
FIG. 9 is a block diagram showing a detail configuration example of the correction amount limiting section.
Figure 10:
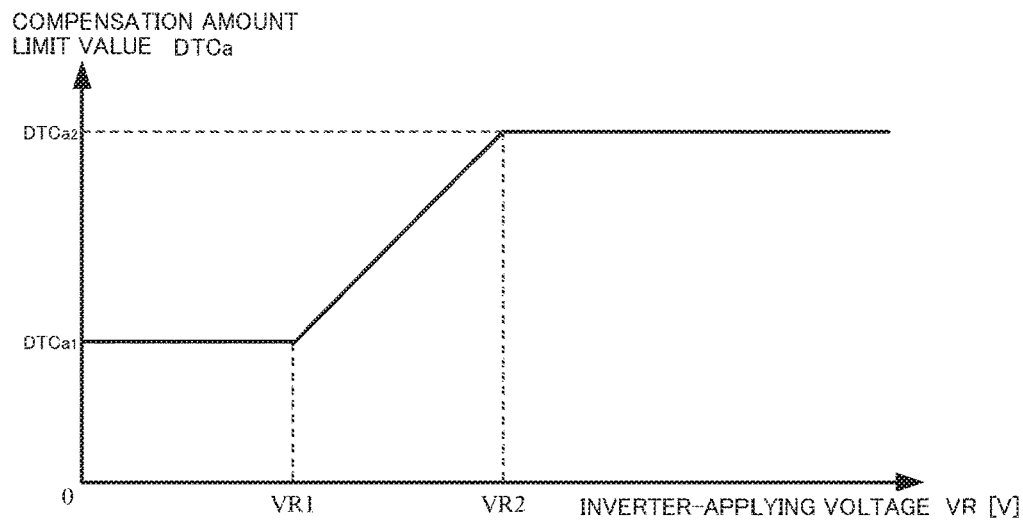
FIG. 10 is a characteristic chart showing an example of the compensation amount upper limit value.

The compensation amount limiting section 250 is sensitive to the inverter-applying voltage VR, and the detail configuration is shown in FIG. 9. The inverter-applying voltage VR is inputted into a compensation upper-lower limit value calculating section 251 in the compensation amount limiting section 250, and a compensation amount limit value DTCa is calculated with a characteristic as shown in FIG. 10. The compensation amount limit value DTCa is a constant limit value DTCa1 when the inverter-applying voltage VR is lower than a predetermined voltage VR1, linearly (or non-linearly) increases when the inverter-applying voltage VR is equal to or higher than the predetermined voltage VR1 and is lower than a predetermined voltage VR2 (>VR1), and holds a constant limit value DTCa2 when the inverter-applying voltage VR is equal to or higher than the predetermined voltage VR2. The compensation amount limit value DTCa is inputted into a contact point a1 of the switching section 252, a comparing section 255 and an inverting section 254. Further, the 3-phase loss voltages PLB ($V_{loss\_u}$, $V_{loss\_v}$, $V_{loss\_w}$) are inputted into comparing sections 255 and 256 and a contact point b1 of the switching section 252. An output "−DTCa" of the inverting section 254 is inputted into a contact point a2 of the switching section 253. The contact points a1 and b1 are switched based on a compared result CP1 of the comparing section 255, and the contact points a2 and b2 are switched based on a compared result CP2 of the comparing section 256.

The comparing section 255 compares the compensation amount limit value DTCa with the 3-phase loss voltages PLB and switches the contact points a1 and b1 of the switching section 252 in accordance with the below Expression 8. Further, the comparing section 256 compares the compensation amount limit value "−DTCa" with the 3-phase loss voltages PLB and switches the contact points a2 and b2 of the switching section 253 in accordance with the below Expression 9.

When the 3-phase loss voltages PLB≥the compensation amount upper-limit value (DTCa), the contact point a1 of the switching section 252 is ON (the contact point b2 of the switching section 253=DTCa).

When the 3-phase loss voltages PLB<the compensation amount upper-limit value (DTCa), the contact point b1 of the switching section 252 is ON (the contact point b2 of the switching section 253=the 3-phase loss voltages PLB). [Expression 8]

When the 3-phase loss voltages PLB≤the compensation amount lower-limit value (−DTCa), the contact point a2 of the switching section 253 is ON (the dead time compensation value DTC=−DTCa). When the 3-phase loss voltages PLB>the compensation amount lower-limit value (−DTCa), the contact point b2 of the switching section 253 is ON (the dead time compensation value DTC=the output of the switching section 252). [Expression 9]

As described above, the present embodiment estimates the 3-phase voltages by detecting the 3-phase motor terminal voltages, calculates the 3-phase correction command voltages from the 3-phase duty command values, and calculates the loss voltages due to the dead time of the inverter from the differences therebetween. From the calculated loss voltages, in a case that the compensation amount exceeding the upper-limit value is detected, the present embodiment judges the disturbance due to the back-EMF or the like and calculates the loss due to the dead time by limiting the compensation values. Further, it is possible to compensate the dead time even on the dq-axes by converting the calculated loss voltages into the loss voltages on the dq-axes and feeding-back the converted loss voltages as the dead time compensation values to the command voltages on the dq-axes.

Figure 11:
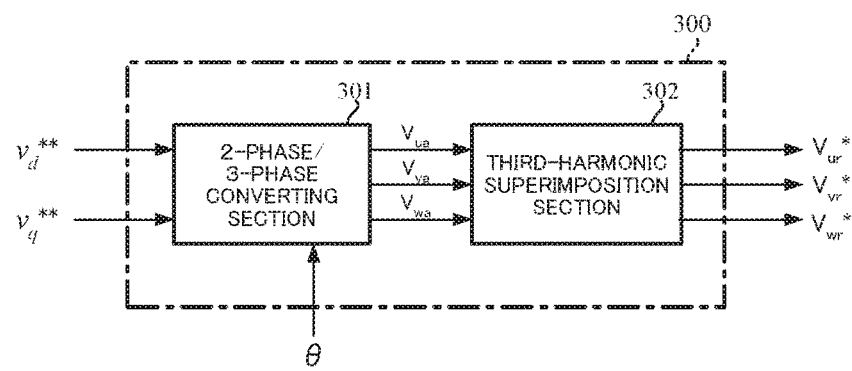
FIG. 11 is a block diagram showing a configuration example of the spatial vector modulating section.

Next, the spatial vector modulation will be described. As shown in FIG. 11, the spatial vector modulating section 300 may have a function that converts the 2-phase voltages $v_d$ and $v_q$ in the d-q space into the 3-phase voltages $V_{ua}$, $V_{va}$ and $V_{wa}$, and superimposes the third harmonic on the 3-phase voltages $V_{ua}$, $V_{va}$ and $V_{wa}$. For example, the method of the spatial vector modulation that the applicant proposes in Japanese Unexamined Patent Publication No. 2017-70066, WO2017/098840 (Japanese Patent Application No. 2015-239898) and the like may be used.

Figure 12:
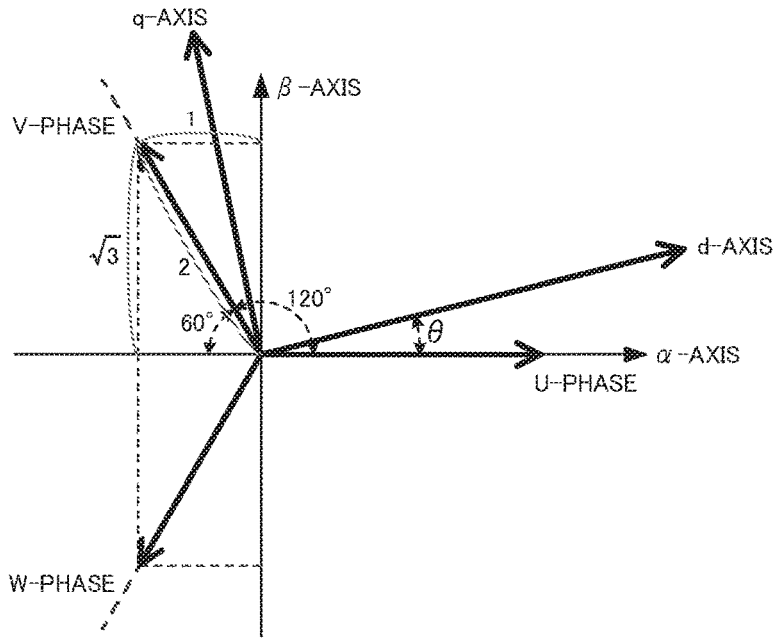
FIG. 12 is a diagram showing an operation example of the spatial vector modulating section.

That is, the spatial vector modulation has a function that performs a following coordinate transformation based on the voltage command values $v_d^*$ and $v_q^{}$ in the d-q space, the motor rotational angle θ and sector number n (#1 to #6), and controls the rotation of the motor by supplying switching patterns S1 to S6 to the motor. The switching patterns S1 to S6 are corresponding to the sectors #1 to #6, and control turning-ON/turning-OFF of the switching devices (the upper-arm Q1, Q3 and Q5, and the lower-arm Q2, Q4 and Q6) of the inverter with the bridge configuration. With reference to the coordinate transformation, in the spatial vector modulation, the voltage command values $v_d^{}$ and $v_q^{**}$ perform the coordinate transformation to the voltage vectors $V\alpha$ and $V\beta$ in the $\alpha$-$\beta$ coordinate system based on an Expression 10. A relationship between the coordinate axes that are used in this coordinate transformation and the motor rotational angle $\theta$ is shown in FIG. 12.

$$\begin{bmatrix} V\alpha \\ V\beta \end{bmatrix} = \begin{bmatrix} \cos\theta & -\sin\theta \\ \sin\theta & \cos\theta \end{bmatrix} \begin{bmatrix} v_d^{} \\ v_q^{} \end{bmatrix} \quad \text{[Expression 10]}$$

A relationship shown in an Expression 11 between a target voltage vector in the d-q coordinate system and a target voltage vector in the $\alpha$-$\beta$ coordinate system is existed. The absolute value of the target voltage vector is conserved.

$$|V| = \sqrt{(v_d^{})^2 + (v_q^{})^2} = \sqrt{V\alpha^2 + V\beta^2} \quad \text{[Expression 11]}$$

Figure 13:
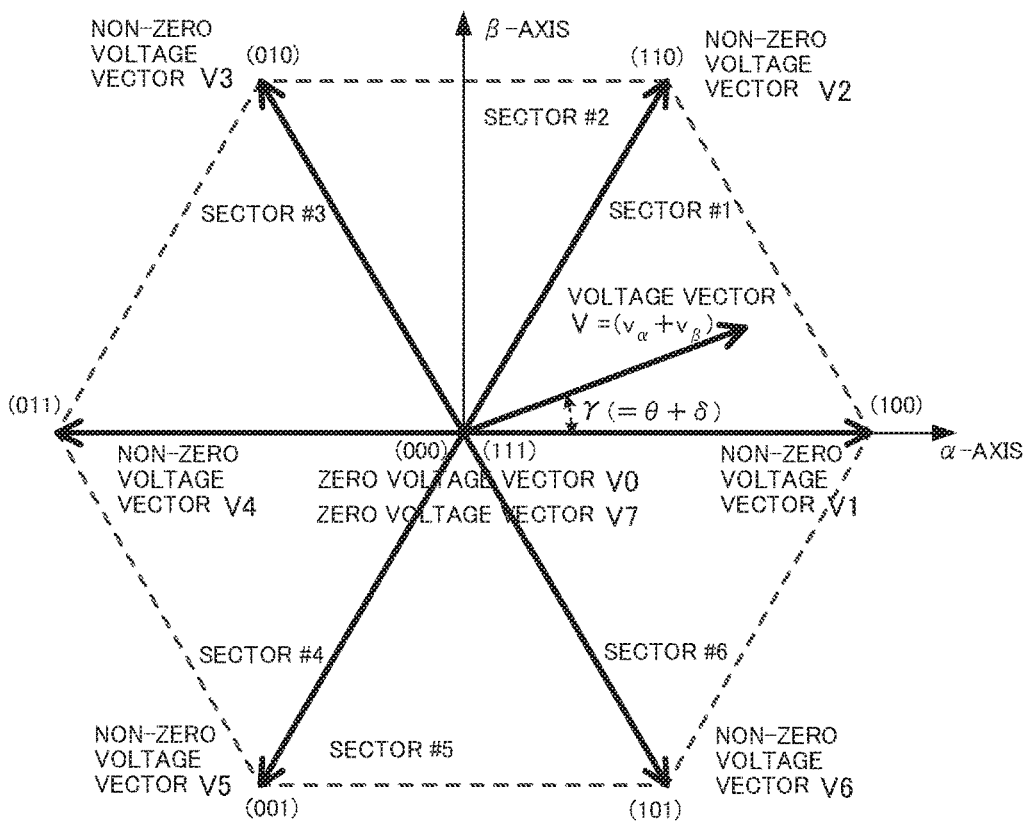
FIG. 13 is a diagram showing an operation example of the spatial vector modulating section.

In the switching pattern of the spatial vector control, the output voltage is defined by using eight discrete reference voltage vectors V0 to V7 (non-zero voltage vectors V1 to V6 that the phase differs every $\pi/3$ [rad] and zero voltage vectors V0 and V7) that are shown in the spatial vector diagram of FIG. 13, depending on the switching patterns S1 to S6 of the switching devices (the FETs) (Q1 to Q6). The selection of these reference output voltage vectors V0 to V7 and the occurring time are controlled. By using six regions sandwiched between adjacent reference output voltage vectors, the spatial vector can be divided into the six sectors #1 to #6, and the target voltage vector V is belong to any one of the sectors #1 to #6, and can be assigned to the sector number. The rotational angle $\gamma$ in the $\alpha$-$\beta$ coordinate system of the target voltage vector V can determine which sector that is separated into a regular hexagon in the $\alpha$-$\beta$ space, as shown in FIG. 13, is existed in the target voltage vector V that is a synthetic vector of $V\alpha$ and $V\beta$. The rotational angle $\gamma$ is determined by a sum of the rotational angle $\theta$ of the motor and a phase $\delta$ obtained from the relationship of the voltage command values $v_d^{}$ and $v_q^{}$ in the d-q coordinate system ($\gamma=\theta+\delta$).

Figure 14:
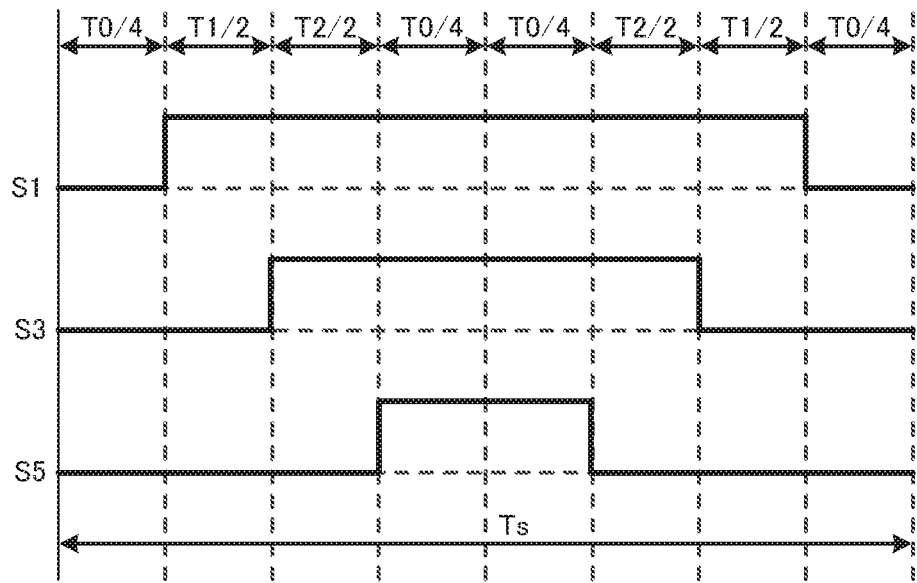
FIG. 14 is a timing chart showing an operation example of the spatial vector modulating section.

FIG. 14 shows a basic timing chart that the switching pulse width and the timing in the turning-ON/turning-OFF signals S1 to S6 to the switching devices (the FETs) are determined in order to output the target voltage vector from the inverter by a digital control by means of the switching patterns S1, S3 and S5 of the inverter in the spatial vector control. The spatial vector modulation performs the calculation and the like in every defined sampling period Ts, and outputs the respective pulse widths and the timings in the switching patterns S1 to S6 to which the calculation result is transformed in the next sampling period Ts.

The spatial vector modulation generates the switching patterns S1 to S6 depending on the sector number that is obtained based on the target voltage vector V. In FIG. 14, in a case of the sector number #1 (n=1), one example of the switching patterns S1 to S6 of the switching devices (the FETs) in the inverter is shown. The signals S1, S3 and S5 show the gate signals of the switching devices Q1, Q3 and Q5 that are corresponding to the upper-arm. The horizontal axis denotes a time, and the sampling period Ts is corresponding to the switching period and is divided into eight periods, T0/4, T1/2, T2/2, T0/4, T0/4, T2/2, T1/2 and T0/4. The periods T1 and T2 are the time depending on the sector number "n" and the rotational angle $\gamma$.

Figure 15:
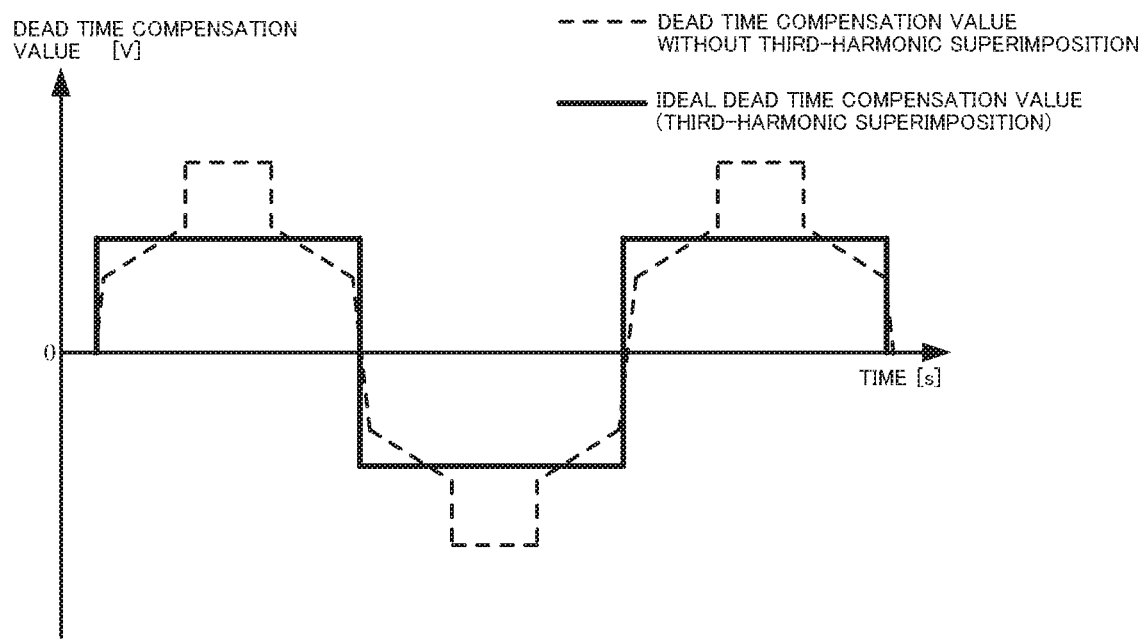
FIG. 15 is a waveform chart showing an effect of the spatial vector modulation.

In a case that the spatial vector modulation is not performed, the dead time compensation of the present invention is applied on the dq-axes, and the dead time compensation value waveform (the U-phase waveform) that the dq-axes/3-phase conversion is performed to only the dead time compensation value is shown in a waveform represented by a dashed line of FIG. 15 that the third-order component is removed. The same phenomena are exhibited in the V-phase and the W-phase. By the spatial vector modulation instead of the dq-axes/3-phase conversion, the third-harmonic can be superimposed on the 3-phase signals, the third-order component that is removed by the 3-phase conversion can be compensated, and the ideal dead time compensation waveform that is shown in a solid line of FIG. 15 can be generated.

Figure 16:
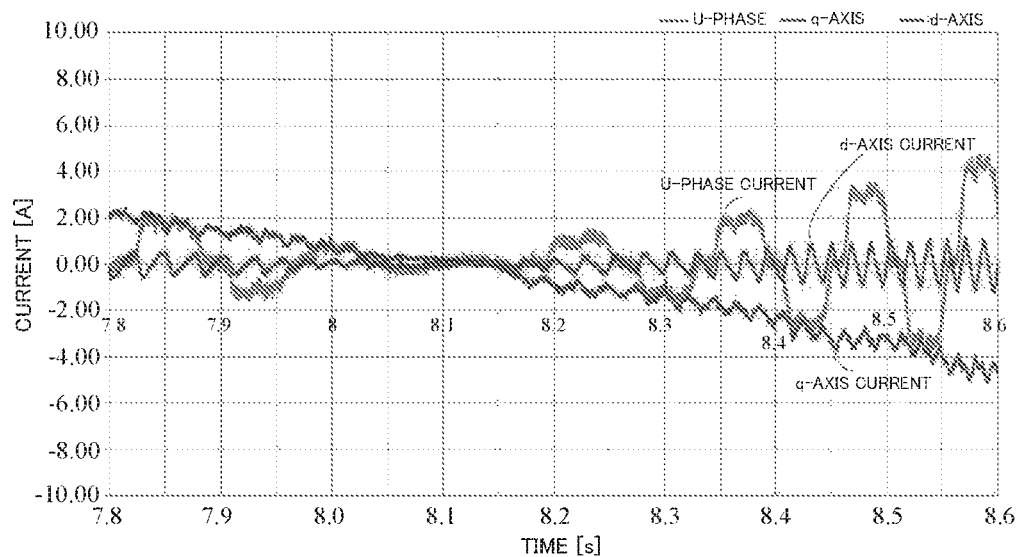
FIG. 16 is a waveform chart showing an effect of the present invention (the first embodiment)
Figure 17:
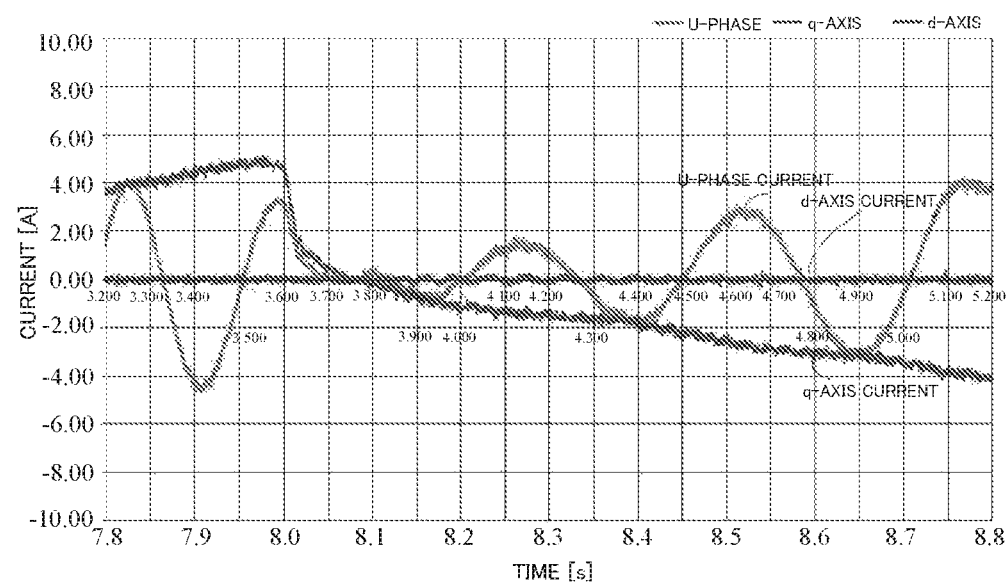
FIG. 17 is a waveform chart showing an effect of the present invention (the first embodiment)

FIGS. 16 and 17 are simulation results showing an effect of the present invention (the first embodiment). FIG. 16 shows the U-phase current, the d-axis current and the q-axis current in a case that the dead time compensation is not performed. By applying the dead time compensation of the present invention, in the high-speed steering state, the improvements in the waveform distortion of the phase currents and the dq-axes currents as shown in FIG. 17 (the ripple is reduced in the dq-axes current waveforms and the phase currents whose waveforms are almost sinusoidal are obtained) can be confirmed. The torque ripple in steering and the steering sound are improved. FIGS. 16 and 17 typically show the U-phase current.

Next, the second embodiment will be described with reference to FIGS. 18 and 19.

Figure 18:
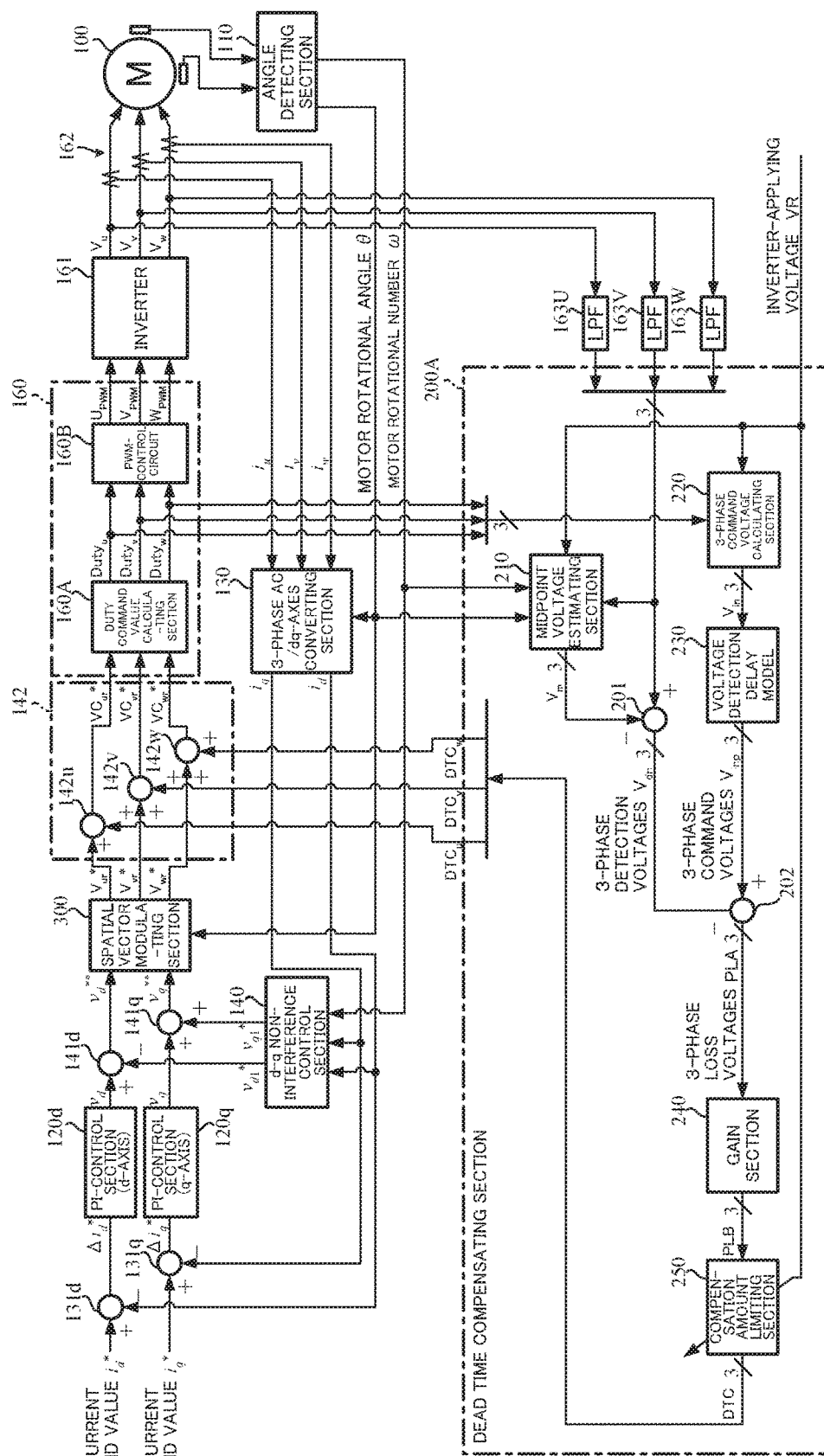
FIG. 18 is a block diagram showing a configuration example (the second embodiment) of the present invention.
Figure 19:
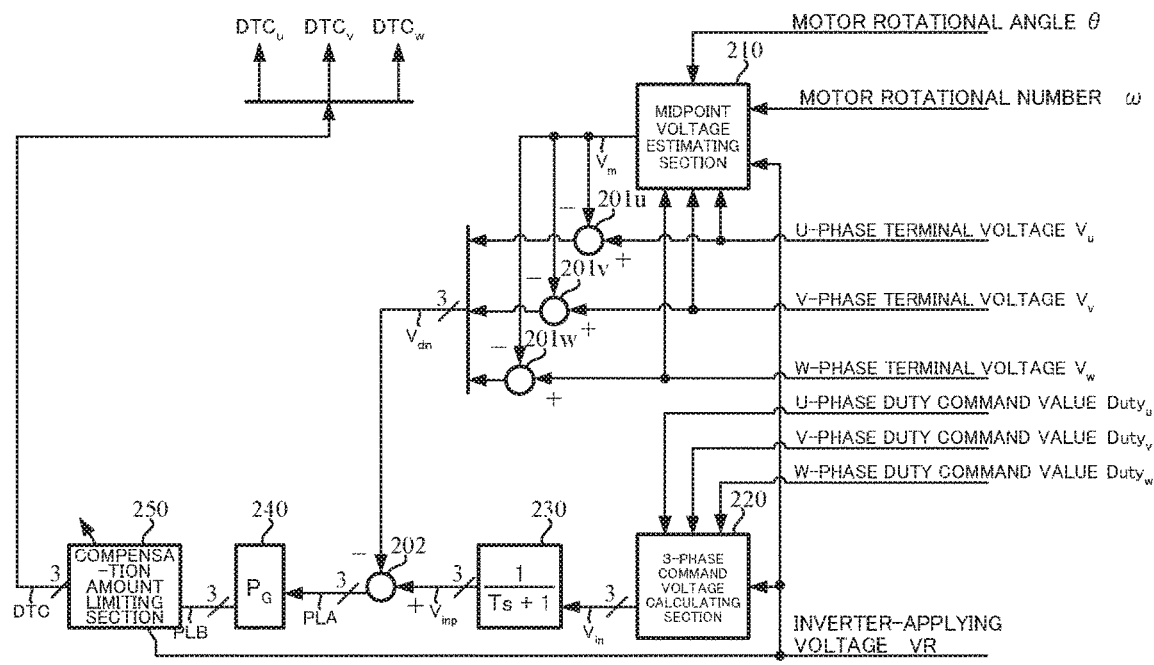
FIG. 19 is a block diagram in details showing a configuration example of a dead time compensating section according to the second embodiment.

FIGS. 18 and 19 are corresponding to FIGS. 5 and 6, respectively. In the dead time compensation section 200A of the second embodiment, the 3-phase AC/dq-axes converting section 260 of the first embodiment is removed. An adding section 142 (142u, 142v and 142w) is disposed on the paths of the 3-phase voltage command values $V_{ur}^*$, $V_{vr}^*$ and $V_{wr}^*$ from the spatial vector modulating section 300. Since other configurations are the same as those of the first embodiment, the explanation is omitted.

In the second embodiment, the dead time compensation values DTC ($DTC_u$, $DTC_v$ and $DTC_w$) outputted from the compensation amount limiting section 250 are not converted into the dq-axes but are held in the 3-phase states, and are inputted into the adding sections 142u, 142v and 142w, respectively. The dead time compensation values $DTC_u$, $DTC_v$ and $DTC_w$ are added (are dead-time-compensated) to the 3-phase voltage command values $V_{ur}^*$, $V_{vr}^*$ and $V_{wr}^*$ at the adding sections 142u, 142v and 142w, respectively. The dead-time-compensated 3-phase voltage command values $V_{uc}$, $V_{vc}$ and $V_{wc}$ are inputted into the duty command value calculating section 160A in the PWM-control section 160.

Figure 20:
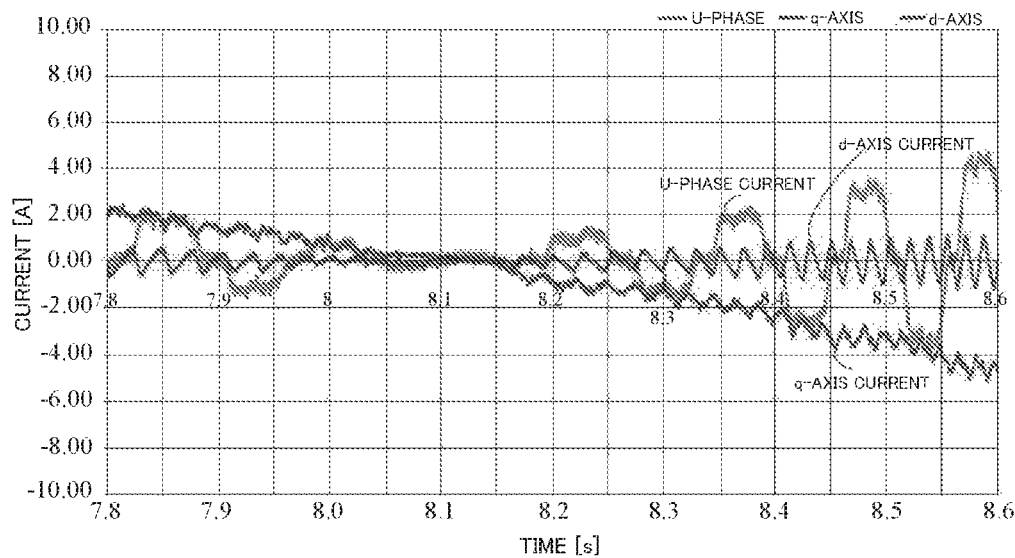
FIG. 20 is a waveform chart showing an effect of the present invention (the second embodiment)
Figure 21:
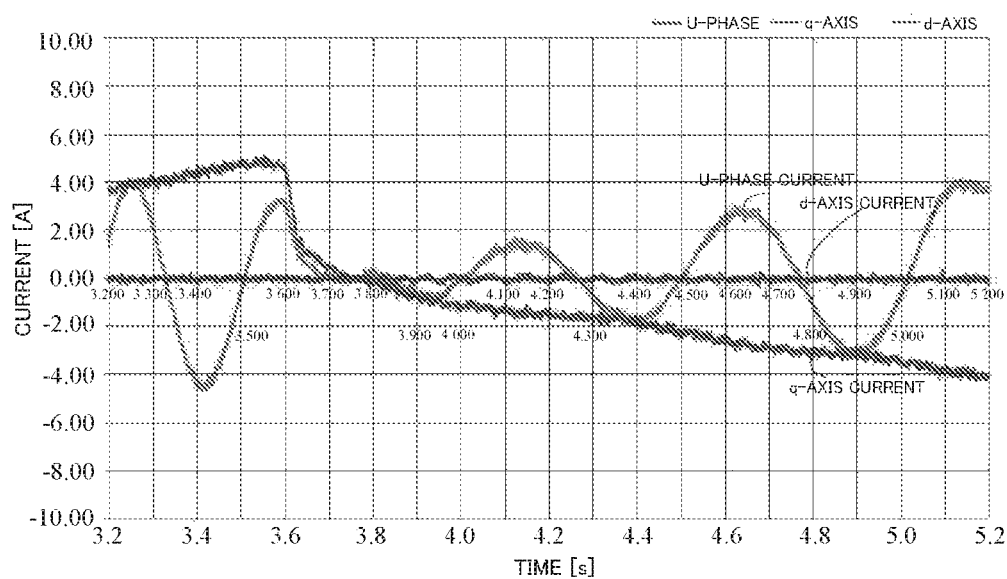
FIG. 21 is a waveform chart showing an effect of the present invention (the second embodiment)

FIGS. 20 and 21 are results showing the effect of the second embodiment of the U-phase in a steering experiment apparatus. FIG. 20 shows the U-phase current, the d-axis current and the q-axis current in a case that the dead time compensation is not performed. By applying the dead time compensation of the second embodiment, in the low speed and low load steering state, the improvements in the waveform distortion of the phase currents and the dq-axes currents as shown in FIG. 21 (the ripple is reduced in the dq-axes current waveforms and the phase currents whose waveforms are almost sinusoidal are obtained) can be confirmed. The torque ripple in the steering and the steering sound are improved.

In the above first and second embodiments, because the delay since detecting the loss voltages by the dead time till reflecting the command voltages is occurred, the compensation amount is slightly less than the ideal compensation amount. Therefore, in the third embodiment as described below, in order to improve the compensation amount, the function that the shortage compensation amount is calculated by multiplying the differences between the ideal dead time compensation values and the detected loss voltages with the current command value sensitivity and is served as the correction value, is added. Thereby, the waveform is corrected to the substantially ideal dead time compensation waveform, and the torque ripple in the steering is reduced. The function that outputs the dead time compensation value depending on the angle is used in the dead time compensation 3-phase ideal model.

Figure 22:
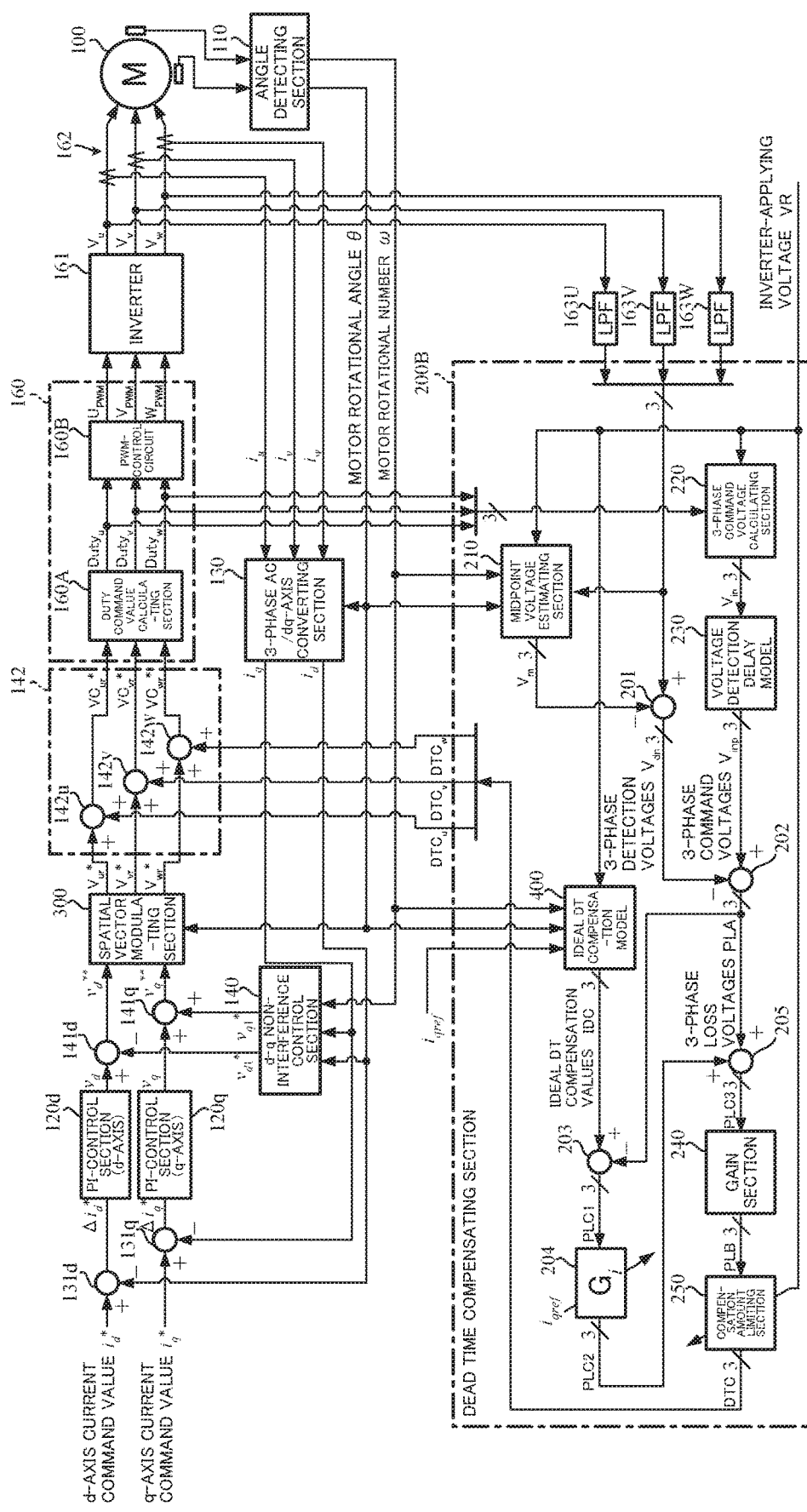
FIG. 22 is a block diagram showing a configuration example (the third embodiment) of the present invention.

FIG. 22 shows the configuration example of the third embodiment, corresponding to FIGS. 5 and 18. In the third embodiment, an ideal dead time compensation model 400 which outputs the 3-phase ideal dead time compensation values IDC ($IDC_u$, $IDC_v$ and $IDC_w$) is provided in the dead time compensating section 200B. The motor rotational angle θ, the motor rotational number ω, the inverter-applying voltage VR and the steering assist command value (the q-axis current command value) $i_{qref}$ are inputted into the ideal dead time compensation model 400. The ideal dead time compensation values IDC calculated at the ideal dead time compensation model 400 are addition-inputted into the subtracting section 203. The 3-phase loss voltages PLA from the subtracting section 202 are subtraction-inputted into the subtracting section 203. The subtracting section 203 subtracts the 3-phase loss voltages PLA from the ideal dead time compensation values IDC ($IDC_u$, $IDC_v$ and $IDC_w$), and voltage differences PLC1, which are the subtracted results, are inputted into a gain section 204. The gain section 204 changes the current gain $G_i$ depending on the q-axis current command value $i_{qref}$, and outputs voltage differences PLC2 that the voltage differences PLC1 are multiplied with the current gain $G_i$. The voltage differences PLC2 are inputted into an adding section 205. The adding section 205 adds the voltage differences PLC2 to the 3-phase loss voltages PLA, and outputs the added results as compensation values PLC3.

An input signal relating to a sensitive operation of the current gain $G_i$ is only the steering assist command value $i_{qref}$ (or the absolute value $|i_{qref}|$). In a minute current region near zero-cross where the sign of the steering assist command value $i_{qref}$ changes, it had better not correct by using the differences for the ideal and a high accuracy is obtained (the error correction is easy occurred due to the chattering of the steering assist command value $i_{qref}$). The current gain $G_i$ is held with "0" till a predetermined current value (e.g. 0.25[A]), gradually increases till a predetermined current value (e.g. 0.75[A]) for the current exceeding the predetermined current value (e.g. 0.25[A]), and is held with a constant (e.g. "0.75") in a case that the steering assist command value $i_{qref}$ exceeds the predetermined current value (e.g. 3.0[A]).

The compensation values PLC3 are inputted into the gain section 240 as well as the first embodiment and the second embodiments, and the 3-phase dead time compensation values DTC ($DTC_u$, $DTC_v$ and $DTC_w$) are outputted via the compensation amount limiting section 250. In the first embodiment, the 3-phase dead time compensation values DTC ($DTC_u$, $DTC_v$ and $DTC_w$) are converted into the 2-phase dq-axes compensation values, and then the 2-phase dq-axes compensation values are fed-back to the dq-axes voltage command values. In the third embodiment, 3-phase dead time compensation values DTC ($DTC_u$, $DTC_v$ and $DTC_w$) are not converted into the 2-phase dq-axes compensation values and are fed-back to the 3-phase space-vector-modulated voltage command values. That is, an adding section 142 ($142_u$, $142_v$ and $142_w$) is provided at the subsequent stage of the spatial vector modulation section 300. The dead time compensation values $DTC_u$, $DTC_v$ and $DTC_w$ are added to the voltage command values $V_{ur}^*$, $V_{vr}^*$ and $V_{wr}^*$ at the adding sections $142_u$, $142_v$ and $142_w$ in the adding section 142. The added 3-phase voltage command values $VC_{ur}$, $VC_{vr}$ and $VC_{wr}^*$ in which the dead time compensation is performed are inputted into the PWM-control section 160.

Figure 23:
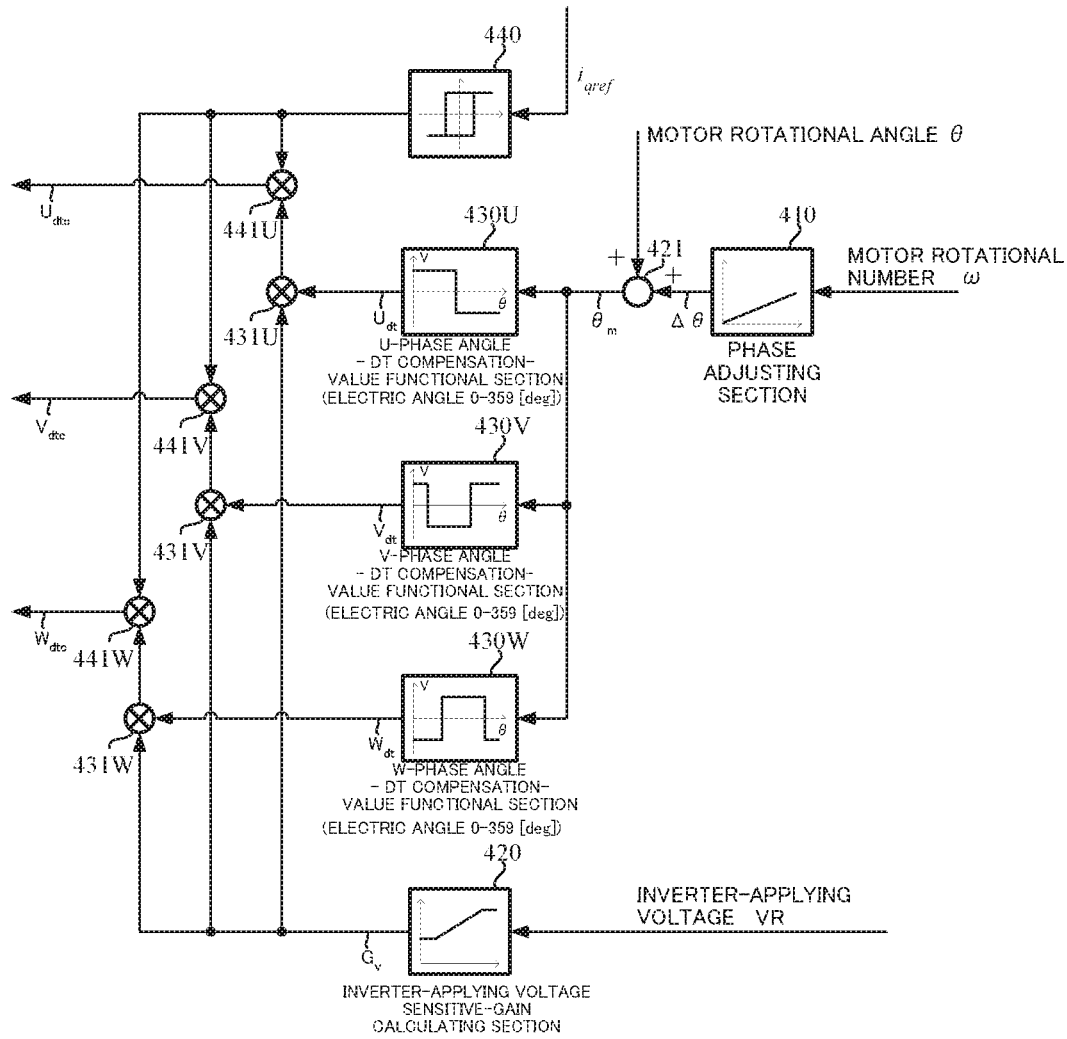
FIG. 23 is a block diagram showing a configuration example of an ideal dead time compensation value model.

FIG. 23 shows details of the ideal dead time compensation model 400. The ideal dead time compensation model 400 comprises 3-phase angle-dead time compensation-value functional sections 430U to 430W, multiplying sections 431U to 431W, a compensation-sign judging section 440 and multiplying sections 441U to 441W.

Figure 24:
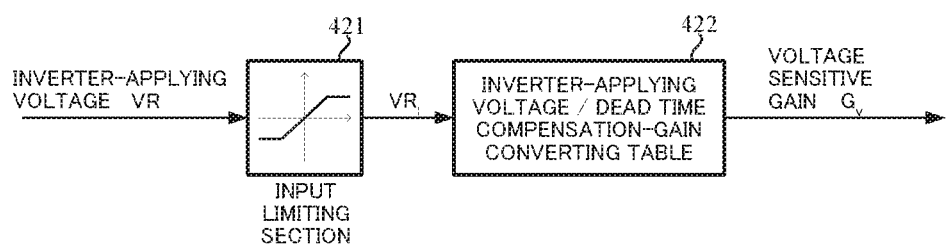
FIG. 24 is a block diagram showing a configuration example of an inverter-applying voltage sensitive-gain section.
Figure 25:
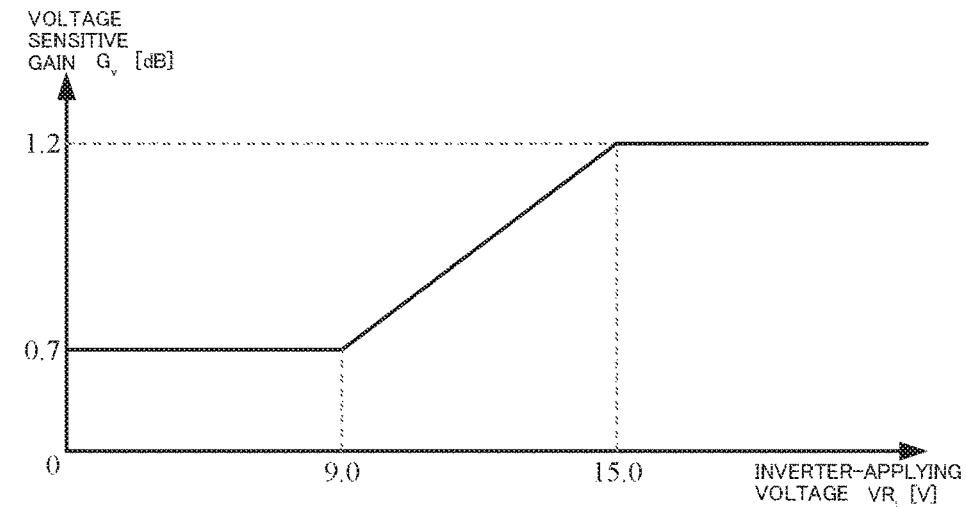
FIG. 25 is a characteristic chart showing a characteristic example of the inverter-applying voltage sensitive-gain section.

Since the optimal dead time compensation amount varies depending on the inverter-applying voltage VR, the present embodiment (the third embodiment) calculates the dead time compensation amount depending on the inverter-applying voltage VR and changes the dead time compensation amount. The configuration of the inverter-applying voltage sensitive-gain calculating section 420 to output the voltage sensitive gain $G_v$ by inputting the inverter-applying voltage VR is shown in FIG. 24. An absolute value of the maximum value of the inverter-applying voltage VR is limited in an input limiting section 421 and the limited inverter-applying voltage $VR_I$ is inputted into an inverter-applying voltage/dead time compensation-gain converting table 422. The characteristic of the inverter-applying voltage/dead time compensation-gain converting table 422 is shown, for example, in FIG. 25. The inverter-applying voltages 9.0[V] and 15.0[V] of inflection points and the voltage sensitive gains "0.7" and "1.2" are presented as examples and are appropriately changeable. The voltage sensitive gain $G_v$ is inputted into the multiplying sections 431U, 431V and 431W.

Figure 26:
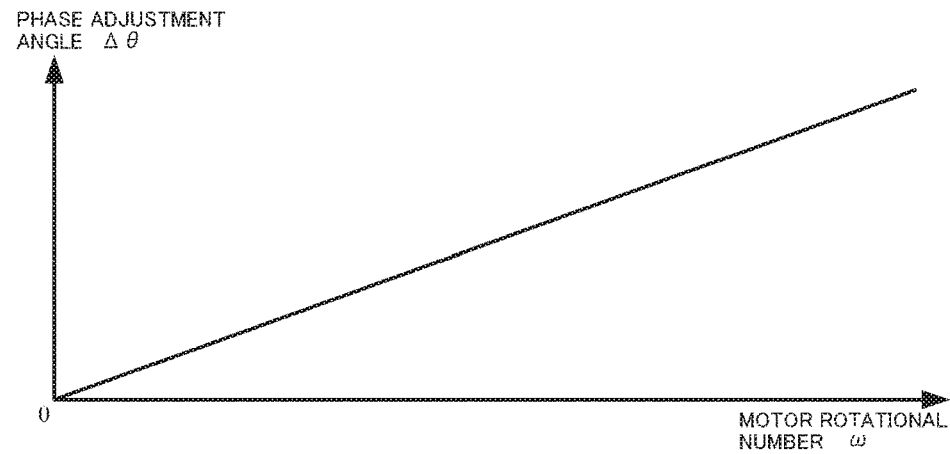
FIG. 26 is a characteristic chart showing a characteristic example of a phase adjusting section.

In a case that the dead time compensation timing is hastened or is delayed in response to the motor rotational number ω, the phase adjusting section 410 has a function to calculate the adjustment angle depending on the motor rotational number ω. The phase adjusting section 410 has a characteristic as shown in FIG. 26 in a case of a lead angle control. The calculated phase adjustment angle Δθ is inputted into the adding section 421 and is added to the detected motor rotational angle θ. The motor rotational angle $θ_m$ (=θ+Δθ) that is an added result of the adding section 421 is inputted into the angle-dead time compensation-value functional sections 430U, 430V and 430W.

Figure 27:
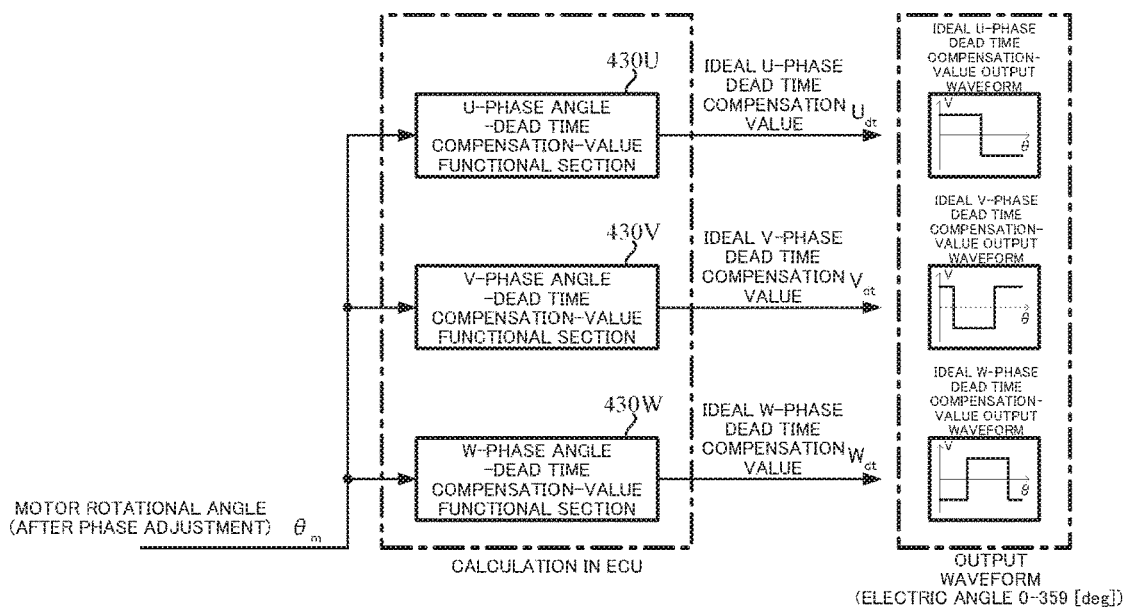
FIG. 27 is a diagram showing an operation example of a 3-phase angle-dead time compensation value function section.

The angle-dead time compensation-value functional sections 430U, 430V and 430W, as shown in FIG. 27 in detail, respectively output 3-phase rectangular wave ideal dead time compensation values $U_{dt}$, $V_{dt}$ and $W_{dt}$ whose phases are shifted each other by 120 [deg] in a range of 0 to 359 [deg] in the electric angle, to the phase-adjusted motor rotational angle $G_m$. The angle-dead time compensation-value functional sections 430U, 430V and 430W treat the dead time compensation values, which are needed in the 3-phases, as functions depending on the angle, calculates the dead time compensation values in the actual time of the ECU, and outputs the ideal dead time compensation values $U_{dt}$, $V_{dt}$ and $W_{dt}$. The angle functions of the dead time reference compensation values are different depending on the characteristic of the dead time in the ECU.

The steering assist command value $i_{qref}$ is inputted into a compensation-sign judging section 440, and a positive-negative sign PMS of the judged steering assist command value $i_{qref}$ is inputted into multiplying sections 441U, 441V and 441W.

The ideal dead time compensation values $U_{dt}$, $V_{dt}$ and $W_{dt}$ from the angle-dead time compensation-value functional sections 430U, 430V and 430W are respectively inputted into multiplying sections 431U, 431V and 431W, and are multiplied with the voltage sensitive gain $G_v$. The 3-phase dead time compensation values $U_{dta}$, $V_{dta}$ and $W_{dta}$ which are multiplied by the voltage sensitive gain $G_v$ are respectively inputted into the multiplying sections 441U, 441V and 441W, and are multiplied with the positive-negative sign PMS. The ideal dead time compensation values $IDC_u$ ($=G_v \cdot U_{dt}$), $IDC_v$ ($=G_v \cdot V_{dt}$) and $IDC_w$ ($=G_v \cdot W_{dt}$) which are multiplied with the positive-negative sign PMS are inputted into the subtracting section 203.

Figure 28A:
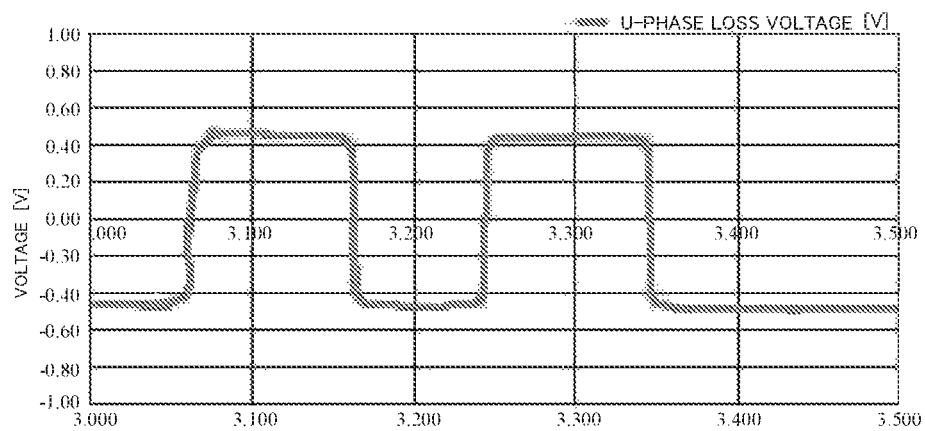
FIGS. 28A to 28D are waveform charts of respective sections showing an effect of the third embodiment.
Figure 28B:
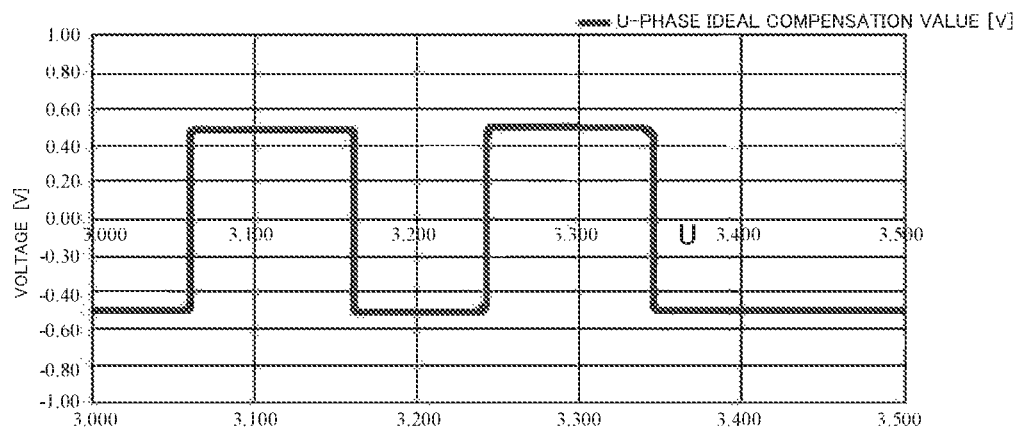
Figure 28C:
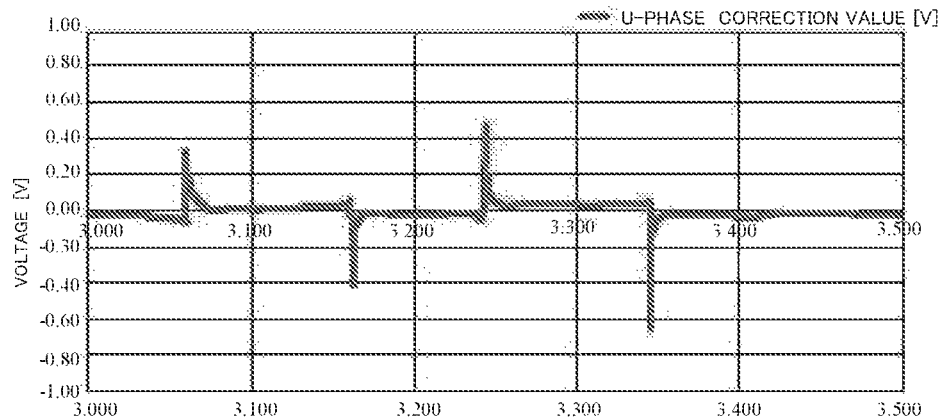
Figure 28D:
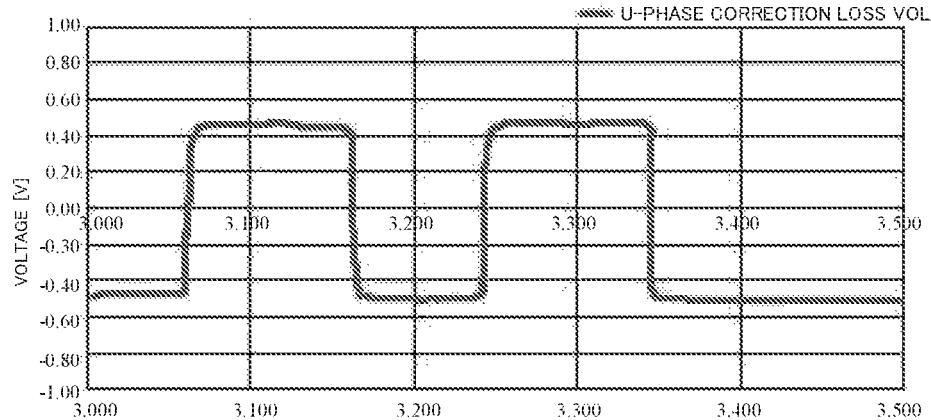

FIGS. 28A to 28D are experiment results showing an effect of the third embodiment in the steering experiment apparatus. FIG. 28A is a waveform of the U-phase loss voltage PLA, FIG. 28B is a waveform of the U-phase ideal dead time compensation value IDC, and FIG. 28C is a waveform of the U-phase voltage difference PLC1 which is an output in the subtracting section 203. FIG. 28D is a waveform of the U-phase correction value PLC3 which is an output in the adding section 205. It is understood that the U-phase correction value PLC3 is corrected to the ideal dead time compensation waveform. Thereby, the torque ripple in steering is reduced.

EXPLANATION OF REFERENCE NUMERALS 1 handle (steering wheel)
2 column shaft (steering shaft, handle shaft)
10 torque sensor
20, 100 motor
30 control unit (ECU)
31 current command value calculating section
35, 203, 204 PI-control section
36, 160 PWM-control section
37, 161 inverter
130 3-phase AC/dq-axes converting section
140 d-q non-interference control section
200, 200A, 200B dead time compensating section
204, 240 gain section
210 midpoint voltage estimating section
220 3-phase command voltage calculating section
230 voltage detection delay model
250 compensation amount limiting section
260 3-phase AC/dq-axes converting section
300 spatial vector modulating section
301 2-phase/3-phase converting section
302 third-harmonic superimposition section
400 ideal dead time compensation model
410 phase adjusting section

The invention claimed is:

1. An electric power steering apparatus of a vector control system that converts dq-axes current command values calculated based on at least a steering torque into 3-phase voltage command values, converts said 3-phase voltage command values into duty command values, driving-controls a 3-phase brushless motor by an inverter of a pulse width modulation (PWM) control, and applies an assist torque to a steering system of a vehicle,
wherein 3-phase detection voltages are estimated based on 3-phase motor terminal voltages,
wherein loss voltages due to a dead time of said inverter are estimated from differences between 3-phase command voltages calculated from said duty command values and said 3-phase detection voltages,
wherein a dead time compensation of said inverter is performed by feeding-back dead time compensation values obtained by compensating said loss voltages to said 3-phase voltage command values, and
wherein said electric power steering apparatus includes a function that limits a maximum upper-limit of a compensation amount of said dead time compensation values by using an inverter-applying voltage and extracts loss voltages due to a dead time from a disturbance.

2. An electric power steering apparatus of a vector control system that converts dq-axes current command values calculated based on at least a steering torque into 3-phase voltage command values, converts said 3-phase voltage command values into duty command values, driving-controls a 3-phase brushless motor by an inverter of a pulse width modulation (PWM) control, and applies an assist torque to a steering system of a vehicle, comprising:
a spatial vector modulating section to spatial-vector-modulate dq-axes voltage command values and obtain said 3-phase voltage command values;
a midpoint voltage estimating section to estimate midpoint voltages based on 3-phase motor terminal voltages, a motor rotational angle, a motor rotational number and an inverter-applying voltage;
a 3-phase detection voltage calculating section to calculate 3-phase detection voltages from said midpoint voltages and said 3-phase motor terminal voltages;
a 3-phase command voltage calculating section to calculate 3-phase command voltages based on said duty command values and said inverter-applying voltage;
a 3-phase loss voltage calculating section to estimate loss voltages due to a dead time of said inverter from differences between said 3-phase detection voltages and said 3-phase command voltages; and
a compensation value limiting section to limit said dead time compensation values by making 3-phase loss voltages calculated at said 3-phase loss voltage calculating section be sensitive to said inverter-applying voltage,
wherein a dead time compensation of said inverter is performed by adding said limited dead time compensation values to said 3-phase voltage command values.

3. The electric power steering apparatus according to claim 2,
wherein a voltage detection delay model is disposed at a subsequent stage of said 3-phase command voltage calculating section, limits an upper-limit of a compensation amount of said dead time compensation values based on said 3-phase motor terminal voltages, and has a function that calculates loss voltages due to said dead time from a disturbance.

4. The electric power steering apparatus according to claim 3, wherein said 3-phase loss voltage calculating section is a subtracting section.

5. The electric power steering apparatus according to claim 2, wherein said 3-phase loss voltage calculating section is a subtracting section.

6. An electric power steering apparatus of a vector control system that converts dq-axes current command values calculated based on at least a steering torque into 3-phase duty command values, driving-controls a 3-phase brushless motor by an inverter of a pulse width modulation (PWM) control, and applies an assist torque to a steering system of a vehicle, wherein 3-phase detection voltages are estimated based on 3-phase motor terminal voltages, wherein loss voltages due to a dead time of said inverter are estimated from differences between 3-phase command voltages calculated from said duty command values and said 3-phase detection voltages, wherein said calculated loss voltages are set as a basic compensation amount, wherein voltage differences between ideal dead time compensation values and said loss voltages, which are a shortage compensation amount, are corrected, and wherein a dead time compensation of said inverter is performed by feeding-back corrected 3-phase values as dead time compensation values to said 3-phase voltage command values.

7. The electric power steering apparatus according to claim 6, wherein said ideal dead time compensation values are calculated based on a motor rotational angle, motor rotational number and an inverter-applying voltage.

8. The electric power steering apparatus according to claim 7, wherein said correction is performed by multiplying said voltage differences with a gain based on a q-axis current command value, and adding said voltage differences which are multiplied with said gain to said voltage values which are multiplied with said gain.

9. The electric power steering apparatus according to claim 6, wherein said correction is performed by multiplying said voltage differences with a gain based on a q-axis current command value, and adding said voltage differences which are multiplied with said gain to said voltage values which are multiplied with said gain.

10. An electric power steering apparatus of a vector control system that converts a d-axis current command value and a q-axis current command value calculated based on at least a steering torque into 3-phase voltage command values, driving-controls a 3-phase brushless motor by an inverter of a pulse width modulation (PWM) control using calculated 3-phase duty command values, and applies an assist torque to a steering system of a vehicle, comprising:

a midpoint voltage estimating section to estimate midpoint voltages based on 3-phase motor terminal voltages, a motor rotational angle, a motor rotational number and an inverter-applying voltage;

a 3-phase detection voltage calculating section to calculate 3-phase detection voltages from said midpoint voltages and said 3-phase motor terminal voltages;

a 3-phase command voltage calculating section to calculate 3-phase command voltages based on said 3-phase duty command values and said inverter-applying voltage;

a loss voltage calculating section to estimate 3-phase loss voltages due to a dead time of said inverter from differences between said 3-phase detection voltages and said 3-phase command voltages;

an ideal dead time compensation model to obtain 3-phase ideal dead time compensation values based on said motor rotational angle, said motor rotational number and said inverter-applying voltage;

a correcting section to correct voltage differences between said 3-phase loss voltages and said 3-phase ideal dead time compensation values based on said q-axis current command value; and an outputting section to output 3-phase dead time compensation values by processing compensation values from said correcting section based on said inverter-applying voltage, wherein a dead time compensation of said inverter is performed by feeding-back said 3-phase dead time compensation values to said 3-phase voltage command values.

11. The electric power steering apparatus according to claim 10, wherein said correcting section comprises:

a first gain section to multiply said voltage differences with a gain based on said q-axis current command value; and an adding section to add said voltage differences from said first gain section to voltage values from said first gain section.

12. The electric power steering apparatus according to claim 11, wherein said outputting section comprises:

a second gain section to multiply compensation values from said adding section with a gain; and a compensation amount limiting section to limit a maximum value of a compensation amount from said second gain section based on said inverter-applying voltage.

13. The electric power steering apparatus according to claim 10, wherein said outputting section comprises:

a second gain section to multiply compensation values from said adding section with a gain; and a compensation amount limiting section to limit a maximum value of a compensation amount from said second gain section based on said inverter-applying voltage.

* * * * *